US009458775B2

(12) United States Patent
Maeda

(10) Patent No.: US 9,458,775 B2
(45) Date of Patent: Oct. 4, 2016

(54) CONTROL APPARATUS OF INTERNAL-COMBUSTION ENGINE

(71) Applicant: Mitsubishi Electric Corporation, Chiyoda-ku, Tokyo (JP)

(72) Inventor: Osamu Maeda, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 269 days.

(21) Appl. No.: 14/458,893

(22) Filed: Aug. 13, 2014

(65) Prior Publication Data

US 2015/0260111 A1 Sep. 17, 2015

(30) Foreign Application Priority Data

Mar. 11, 2014 (JP) ................................. 2014-047140

(51) Int. Cl.
F02D 37/02 (2006.01)
F02P 5/04 (2006.01)
F02P 5/15 (2006.01)
F02P 5/145 (2006.01)
F02D 41/00 (2006.01)
F02D 41/30 (2006.01)

(52) U.S. Cl.
CPC ............ F02D 37/02 (2013.01); F02D 41/006 (2013.01); F02D 41/3041 (2013.01); F02P 5/04 (2013.01); F02P 5/145 (2013.01); F02P 5/15 (2013.01); F02P 5/1504 (2013.01); F02P 5/1512 (2013.01); F02P 5/1516 (2013.01); Y02T 10/128 (2013.01); Y02T 10/46 (2013.01); Y02T 10/47 (2013.01)

(58) Field of Classification Search
CPC ....... F02D 37/02; F02D 41/3041; F02P 5/04; F02P 5/145; F02P 5/15; F02P 5/1504; F02P 5/1512
USPC ................ 123/295, 406.13, 406.21, 406.24, 123/406.29, 406.33; 701/111, 114; 73/35.06, 35.09
See application file for complete search history.

(56) References Cited

U.S. PATENT DOCUMENTS

2005/0016496 A1 1/2005 Hitomi et al.
2008/0294325 A1* 11/2008 Kurotani ................... F02B 1/08 701/102
2009/0259387 A1* 10/2009 Kakuya ............... F02D 13/0265 701/103

FOREIGN PATENT DOCUMENTS

JP 2005-016408 A 1/2005

* cited by examiner

Primary Examiner — Mahmoud Gimie
(74) Attorney, Agent, or Firm — Sughrue Mion, PLLC

(57) ABSTRACT

The control apparatus includes a transient-state ignition-timing correction unit in which, in order to set a change in ignition timing made coincident with a change in an internal EGR temperature and also made coincident with the strength of the transient when the transient operating state occurs, an ignition-timing correction-coefficient during the transient operating state and after the transient operating state is calculated in accordance with an internal EGR temperature discrepancy-degree derived from the internal EGR temperature and a steady-state exhaust-gas temperature, and with transient strength derived from a magnitude of change in the operating state and an elapse time since the transient operating state has started, and the ignition timing is corrected by a transient-state ignition-timing correction-coefficient.

4 Claims, 8 Drawing Sheets

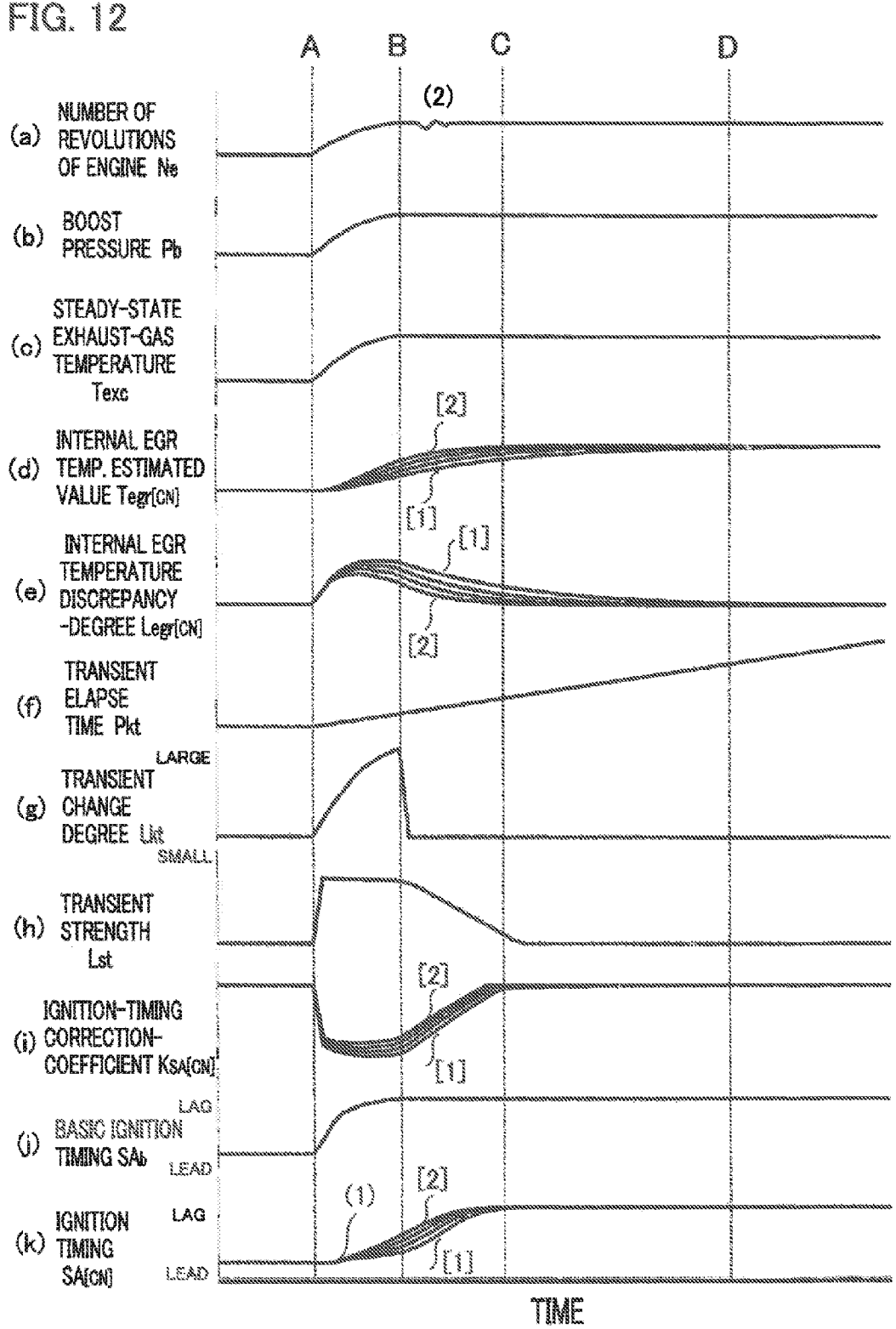

CONTROL APPARATUS OF INTERNAL-COMBUSTION ENGINE

BACKGROUND OF THE INVENTION

1. Field of the Invention

The present invention relates to a control apparatus of a cylinder-inside injection-type internal-combustion engine, and in particular to a control apparatus of the internal-combustion engine in which, under its homogeneous-charge compression-ignition combustion-mode control, an ignition timing control is performed when a transient operating state occurs.

2. Description of the Related Art

In recent years, associated with variations or the like of atmospheric pollution and petroleum conditions, the enhancement in exhaust-gas quality and fuel consumption of an internal-combustion engine (hereinafter referred to as an "engine") is strongly demanded. As one method among those to enhance exhaust-gas quality and fuel consumption of an engine using gasoline, a combustion control by homogeneous-charge compression ignition (hereinafter referred to as an "HCCI," HCCI: Homogeneous-Charge Compression Ignition) receives attention in which the combustion in the gasoline engine is achieved by making a fuel-air mixture higher in temperature and in pressure at the latter part of a compression stroke and by self-igniting the fuel-air mixture, without using spark-discharge ignition.

In HCCI combustion, fuel consumption can be reduced by combustion with leaner fuel-air mixture in comparison with spark-discharge ignition combustion, and reduction of nitrogen oxides (NOx) can be achieved at lower combustion temperatures in comparison with spark-discharge ignition combustion; meanwhile, for example, at a fuel-air mixture temperature equivalent to that of spark-discharge ignition, the temperature is too low to advance self-ignition, causing in occurrence of a misfire; and, when the fuel-air mixture temperature is increased too far, a combustion speed becomes excessively high, causing in occurrence of knocking. To this end, it is well known in the art that, in order to obtain the fuel-air mixture temperature that advances the HCCI combustion better, a control technique employs an internal exhaust-gas recirculation (hereinafter referred to as an "internal EGR," EGR: Exhaust Gas Recirculation) due to a negative valve overlap in which an exhaust valve is closed when a piston is before the top dead center of intake, and an intake valve is opened when the piston is after the top dead center of intake, so that the fuel-air mixture temperature is increased.

According to this art well known, there arises a case in which, in an operating area where the number of revolutions of the engine is relatively low and the load is relatively light, HCCI combustion can be achieved by employing the internal EGR so as to control the fuel-air mixture temperature inside of a cylinder; however, in an operating area where the number of revolutions of the engine is further lower and the load is further lighter, the fuel-air mixture temperature does not reach a level in which good HCCI combustion is performed, because the combustion temperature is too low even if the internal EGR is employed. To this end, as a control capable of obtaining good HCCI combustion even in those cases described above, an ignition assist control is conceivable which introduces spark-discharge ignition for enhancing self-ignition.

For example, in Japanese Patent Application Publication No. 2005-016408, an HCCI combustion control is made possible in which, in an HCCI combustion mode, an ignition assist is performed by spark-discharge ignition to a fuel-air mixture before the top dead center of compression using an ignition timing characteristic responding to an octane number being set in advance, so that a misfire or knocking does not occur.

PROBLEMS TO BE SOLVED BY THE INVENTION

Here, when it is focused on a case in which, the engine is in a transient operating state so that its operating state is changing in the HCCI combustion by an ignition assist, it may give rise to cause degradation of the combustion producing such a misfire and knocking, when an instantaneous operating state is detected similarly to a steady-state operating state, and the spark-discharge ignition is performed with ignition timing responding to that in the instantaneous operating state, as disclosed in Japanese Patent Application Publication No. 2005-016408.

What causes the degradation of the combustion is originated in a "delay" of an internal EGR gas. Because the internal EGR gas is a combustion gas by one preceding or upstream cycle in each cylinder, internal EGR in a different operating state is introduced by one upstream cycle during the transient operating state; and thus, the combustion is degraded because the internal EGR temperature differs from that during the steady-state operating state where the internal EGR of the same operating state is also introduced by one upstream cycle. For example, when an operating state is to change from a steady-state operating state "A" to a steady-state operating state "B" as illustrated in FIG. 6, an internal EGR temperature is constant because the steady-state operating state "A" continues until timing (1); however, when the operating state changes to the operating state "B" with timing (2) to become a transient operating state, an internal EGR temperature is a temperature "b" because the internal EGR temperature introduced with the timing (2) is the same as that of the timing (1). Here, if an ignition assist is performed with ignition timing taking no account on the transient operating state, the ignition assist is performed with the ignition timing assuming an internal EGR temperature "a" in spite of the internal EGR temperature of the timing (2) that is the temperature "b"; for this reason, appropriate ignition timing is not achieved with respect to an actual internal EGR temperature and the fuel-air mixture temperature in the latter part of a compression stroke, so that it would be probable that a misfire occurs owing to lack of self-ignition enhancement, and that knocking occurs owing to excess of self-ignition enhancement.

Moreover, there exists a delay in response to a change in temperature of the internal EGR gas due to the transient operating state. FIG. 6 is an image diagram illustrating behavior of internal EGR temperatures when the engine is in the transient operating state. For example, as illustrated in FIG. 6, because, in timing (3) immediately after the transient operating state, an internal EGR gas is introduced that is obtained by the combustion of the timing (2) as the reason described above, the internal EGR temperature should be the temperature "a"; however, heat dissipated from the internal EGR through a piston, a cylinder wall-surface and the like is in a stage partway to change in the timing (3), and thus the internal EGR takes a temperature "c" that is slightly changed from the temperature "b." Subsequently, heat gradually dissipated through a piston, a cylinder wall-surface and the like becomes constant, so that the internal EGR takes the temperature "a" in timing (4). Here, if an ignition assist is performed with ignition timing taking no account on the transient operating state, the ignition assist is performed with the ignition timing assuming an internal EGR temperature "a" in the timing from (3) to the timing (4); for this reason, appropriate ignition timing is not achieved with respect to an actual internal EGR temperature and the fuel-air mixture temperature in the latter part of a compression stroke, so that it would be probable that a misfire occurs owing to lack of self-ignition enhancement, and that knocking occurs owing to excess of self-ignition enhancement.

As described above, although the internal EGR that increases the fuel-air mixture temperature is a ruling factor responsible for causing self-ignition, the ignition timing is also a ruling factor in the same way; and thus, without controlling the behavior of this internal EGR and that of the ignition timing in an appropriate manner when a transient operating state occurs, good HCCI combustion cannot be obtained.

According to the results of further study conducted by the inventor of the present invention, it can be understood that, when an operating state of the engine is in a transient operating state, an allowable range of ignition timing responding to the internal EGR temperature changes when the strength of the transient operating state (sharp transient in which a change in an operating state is large, a moderate transient in which the change in an operating state is small, and the like) changes. To be specific, for example in FIG. 6, when a change from the operating state "A" to the operating state "B" is moderate, an allowable range of ignition timing responding to the internal EGR temperature is wide, so that it can be understood that, with a timing in which the internal EGR temperature becomes the temperature "d," even if the ignition assist is performed with ignition timing in which the internal EGR temperature "a" is presumed, good HCCI combustion can be achieved. Meanwhile, when the change from the operating state "A" to the operating state "B" is sharp, the allowable range of ignition timing responding to the internal EGR temperature is narrow, so that it can be understood that, if the ignition assist is not performed with the ignition timing by presuming an internal EGR temperature of the temperature "d" at the internal EGR temperature "d," and (also) by presuming an internal EGR temperature of the temperature "e" at the internal EGR temperature "e," good HCCI combustion cannot be achieved.

Because of the arrangement described above, in order to finish a change ignition timing as soon as possible while keeping good in a state of HCCI combustion by the ignition assist when a transient operating state occurs, it has been made clear that the ignition timing is required to be changed in accordance with a delay of change in the internal EGR temperature, and with the strength of transient operation during the transient operating state and after the transient operating state.

Here, as a method other than the one controlling the ignition timing when a transient operating state occurs, a case is also conceivable in which the amount of internal EGR, the amount of intake air, the amount of combustion injection, fuel injection timing and the like are controlled; however, in the HCCI combustion by the ignition assist, an effect to appropriately control the ignition timing is large for combustion stability, and also a delay from a change in a control parameter(s) to the control actually carried out is shorter, enabling also ignition timing-setting for individual cylinders in a multi-cylindered engine; for these reasons, the method is an effective means in which the ignition timing is controlled in accordance with a change in the internal EGR temperature, and with the strength of transient operation during the transient operating state and after the transient operating state.

For dealing therewith, the present invention has been directed at solving these problems described above, and an object of the invention is to provide a control apparatus of an internal-combustion engine in which, under an HCCI combustion control by the ignition assist when a transient operating state occurs, the ignition timing is corrected in accordance with a delay of a change in the internal EGR temperature and with the strength of transient operation during the transient operating state and after the transient operating state, so that it is not required to mount an expensive sensor(s) or the like for directly detecting the internal EGR temperature and/or a fuel-air mixture temperature inside of a cylinder, and, even when the engine is in the transient operating state, a change in ignition timing can be finished as soon as possible while keeping the HCCI combustion good without causing a misfire and/or knocking.

SUMMARY OF THE INVENTION

Means for Solving the Problems

A control apparatus of an internal-combustion engine according to the present invention, including:

a fuel injection valve for directly injecting a fuel inside of a cylinder of the internal-combustion engine;

an intake valve for introducing air inside of the cylinder;

an exhaust valve for discharging a combustion gas inside of the cylinder;

a variable valve mechanism for variably adjusting open/close timing and amounts of lift of the intake valve and the exhaust valve;

a spark plug for igniting, with a spark, a mixture of air and the fuel inside of the cylinder; and a homogeneous-charge compression-ignition combustion control mechanism for performing internal exhaust-gas recirculation inside of the cylinder by controlling open/close timing and amounts of lift of the intake valve and the exhaust valve using the variable valve mechanism, and for performing, with respect to a mixture of air being introduced and a fuel being injected which are heated by the internal exhaust-gas recirculation at a latter part of a compression stroke of the internal-combustion engine before homogeneous-charge compression-ignition combustion, an ignition assist control by spark ignition so as to enhance the homogeneous-charge compression-ignition combustion, the control apparatus of an internal-combustion engine comprises:

an internal exhaust-gas recirculation temperature estimation means for estimating a temperature of the internal exhaust-gas recirculation in the internal-combustion engine;

a steady-state exhaust-gas temperature calculation means for calculating an exhaust-gas temperature of the combustion gas when a state of the internal-combustion engine has been in a steady-state operating state;

an internal exhaust-gas recirculation temperature discrepancy-degree estimation means for calculating, in accordance with a temperature of the internal exhaust-gas recirculation being estimated and an exhaust-gas temperature being calculated in the steady-state operating state, an internal exhaust-gas recirculation temperature discrepancy-degree as a delay of change in a temperature of the internal exhaust-gas recirculation, when a state of the internal-combustion engine is in progress in a transient operating state, and after the transient operating state;

a transient change-degree calculation means for calculating a transient change degree indicating a magnitude of change in an operating state of the internal-combustion engine;

a transient elapse time calculation means for calculating a transient elapse time since the transient operating state of the internal-combustion engine has started;

a transient strength calculation means for calculating, from a characteristic responding to a transient change degree being calculated and a transient elapse time being calculated, transient strength as strength of a transient operating state, when a state of the internal-combustion engine is in progress in the transient operating state and after the transient operating state;

a transient-state ignition-timing correction-coefficient calculation means for calculating a transient-state ignition-timing correction-coefficient responding to an internal exhaust-gas recirculation temperature discrepancy-degree being calculated and transient strength being calculated during the transient operating state and after the transient operating state so as to set a change in ignition timing made coincident with a change in a temperature of the internal exhaust-gas recirculation, and also made coincident with the transient strength of transient operating state being calculated; and a transient-state ignition-timing correction means for correcting the ignition timing on a basis of the transient-state ignition-timing correction-coefficient being calculated.

Effects of the Invention

As the effects obtained by the control apparatus of the internal-combustion engine according to the present invention, an internal exhaust-gas recirculation (EGR) temperature discrepancy-degree during a transient operating state and after the transient operating state is calculated in accordance with an internal EGR temperature and a steady-state exhaust-gas temperature; the strength of the transient operating state during the transient operating state and after the transient operating state is calculated from a characteristic responding to a transient change degree and a transient elapse time; an ignition-timing correction-coefficient during the transient operating state and after the transient operating state is calculated responding to an internal EGR temperature discrepancy-degree being calculated and transient strength; and the ignition timing is corrected by the calculated transient-state ignition-timing correction-coefficient; and whereby it is possible to control the ignition timing by appropriately defining a delay of change in the internal EGR temperature during the transient operating state of the engine and after its transient operating state thereof, and by appropriately defining an allowable range with respect to the internal EGR temperature responding to the strength of the transient operating state, so that it is not required to mount an expensive sensor(s) or the like, and a change in ignition timing is finished as soon as possible while keeping the HCCI combustion good by an ignition assist when a transient operating state occurs, enabling to enhance exhaust-gas quality, fuel consumption, and drivability.

BRIEF DESCRIPTION OF DRAWINGS

The foregoing and other objects, features, aspects and advantages of the present invention will become more apparent from the following detailed description of the present invention when taken in conjunction with the accompanying drawings.

FIG. 12 is a timing diagram illustrating behavior in which ignition-timing corrections are performed when a transient operating state occurs in the control apparatus of the internal-combustion engine according to Embodiment 2 of the present invention.

DETAILED DESCRIPTION OF THE PREFERRED EMBODIMENTS

Figure 1:
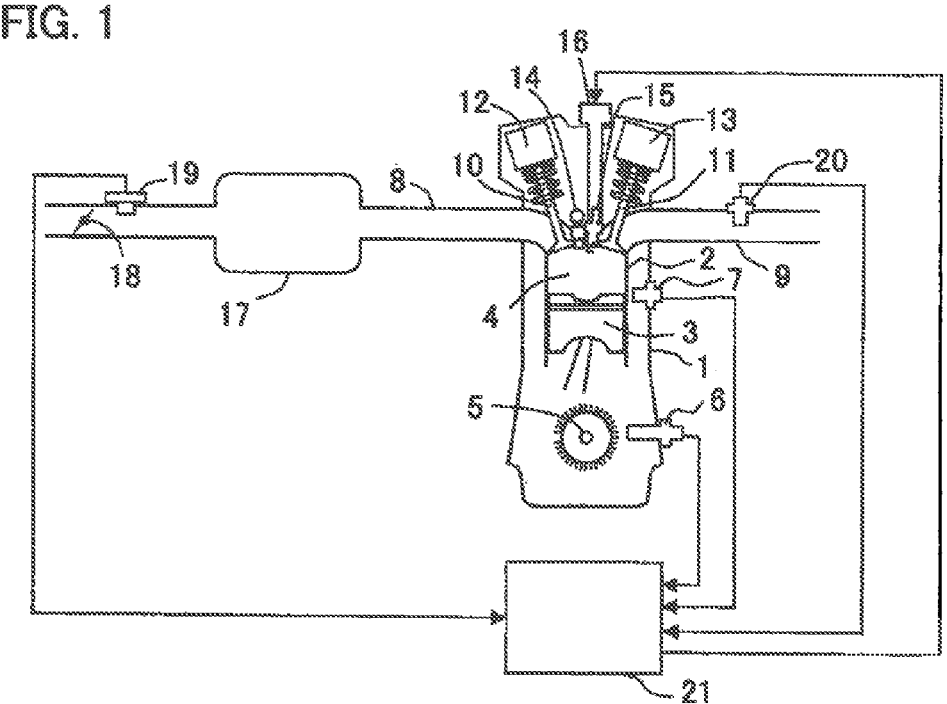
FIG. 1 is a configuration diagram illustrating an overall system including a control apparatus of an internal-combustion engine according to Embodiment 1 and Embodiment 2 of the present invention.

Hereinafter, each of the embodiments according to the present invention will be described with reference to the accompanying drawings; in each of the figures, the explanation will be made for the same or corresponding members, portions or parts by designating the same reference numerals and symbols.

Embodiment 1

In a control apparatus of an internal-combustion engine according to Embodiment 1 of the present invention described below, it is presumed that the engine is operated in an HCCI combustion mode, and also a spark-discharge ignition control is performed. And then, the control apparatus of the internal-combustion engine according to Embodiment 1 of the present invention described below is a control apparatus in which, when a transient operating state occurs in an engine, a transient-state ignition-timing correction-coefficient is calculated, by directing at an internal EGR temperature and transient strength, from the internal EGR temperature discrepancy and the transient strength, and transient-state ignition timing is calculated by correcting steady-state ignition timing in accordance with the transient-state ignition-timing correction-coefficient being calculated.

Figure 2:
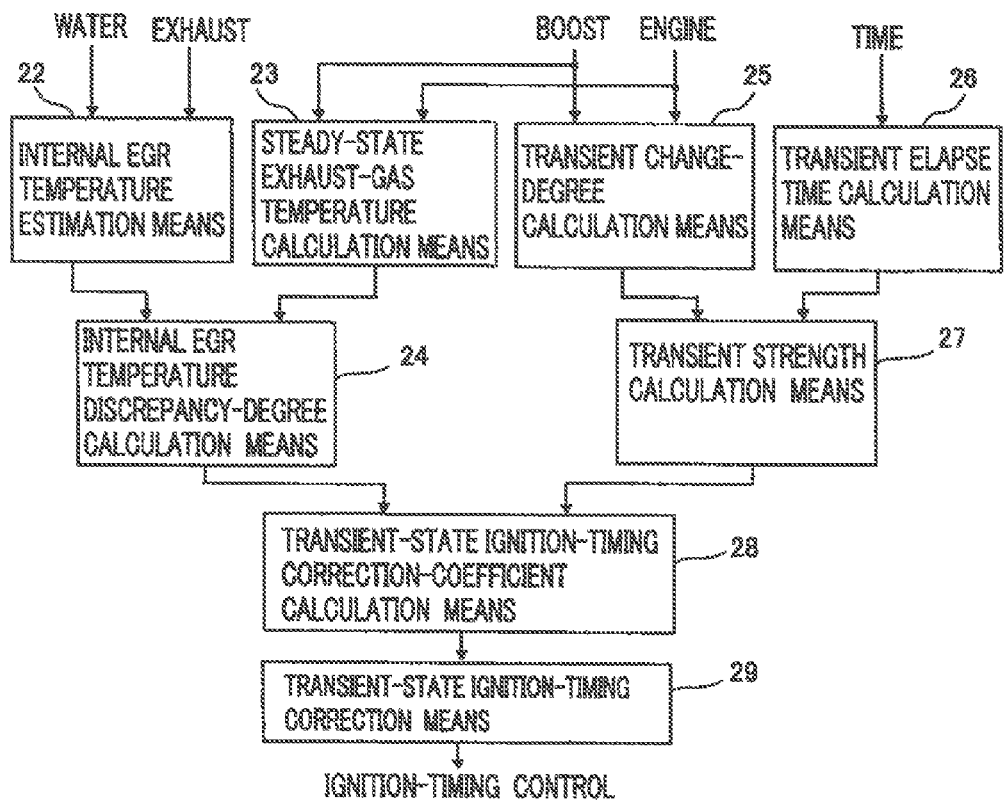
FIG. 2 is a block diagram illustrating the control apparatus of the internal-combustion engine according to Embodiment 1 of the present invention.

FIG. 1 is a configuration diagram illustrating an overall system including the control apparatus of the internal-combustion engine according to Embodiment 1 and Embodiment 2 of the present invention as will be described later. Note that, in an engine, a plurality of cylinders is generally mounted; however, the following explanation will be made for one cylinder 2 as illustrated in FIG. 2, among a plurality of cylinders.

In FIG. 1, in an exemplary engine 1 the cylinder 2 in a tubular shape is mounted. In a direction of axis line of the cylinder 2, a piston 3 is mounted that is reciprocally movable. By these cylinder 2 and piston 3, a combustion chamber 4 is formed in which a mixture of a fuel and air is burned. In addition, a crankshaft 5 is mounted to convert the reciprocal motion of the piston 3 into rotational motion, and a crankshaft angle sensor 6 is provided for detecting a rotational angle (crankshaft angle) of the crankshaft 5. Moreover, in the cylinder 2, a water temperature sensor 7 is provided for outputting a voltage responding to a temperature of cooling water (not shown in the figure) in order to cool the engine 1.

To the cylinder 2, connected are an intake manifold 8 that charges or introduces air into the inside of the cylinder 2 (hereinafter referred to as "inside of a cylinder," or "cylinder-inside"), and an exhaust manifold 9 that sends out or discharges an exhaust gas produced when a fuel-air mixture burns in the combustion chamber 4. In addition, on the cylinder 2, two pairs of valves are mounted, which are intake valves 10 that open/close between the combustion chamber 4 and the intake manifold 8, and exhaust valves 11 that open/close between the combustion chamber 4 and the exhaust manifold 9 (these pairs are shown on a one-by-one basis in FIG. 2).

In order to control the intake valves 10 and the exhaust valves 11 with appropriate open/close timing and appropriate amounts of their lift, mounted in upper portions of the intake valves 10 and the exhaust valves 11 are a variable intake-valve mechanism 12 and a variable exhaust-valve mechanism 13 which include cams (not shown in the figure) that rotationally move to push down each pair of the valves, respectively. Moreover, on either one of the cams, a cam angle sensor (not shown in the figure) is mounted so as to detect rotation of the cam(s).

On a top portion of the cylinder 2, a fuel injection valve 14 is mounted for directly injecting a fuel into the inside of the cylinder 2 with appropriate timing. Moreover, on a top portion of the cylinder 2, a spark plug 15 is mounted for igniting, with a spark, a fuel-air mixture formed in the combustion chamber 4, and an ignition coil 16 is mounted for supplying energy of a high voltage to the spark plug 15. Timing to ignite with a spark by the spark plug 15 is controlled with appropriate timing according to ignition timing as will be described later.

Upstream of the intake manifold 8, a surge tank 17 is connected for temporarily accumulating air to be introduced into the combustion chamber 4, and, upstream of the surge tank 17, a throttle valve 18 is connected. In addition, downstream of the throttle valve 18, a boost pressure sensor 19 is provided for outputting a voltage responding to boost pressure.

For the exhaust manifold 9, an exhaust-gas temperature sensor 20 is provided that outputs a voltage responding to a temperature of an exhaust gas passing through the exhaust manifold 9. Downstream of the exhaust manifold 9, a catalytic converter (not shown in the figure) is connected therethrough for removing toxic substances in exhaust gases, and, downstream of the catalytic converter, a tail pipe (not shown in the figure) is connected therethrough for discharging the exhaust gases to the exterior.

An engine-controlling electronic control unit (hereinafter referred to as an "ECU") 21 is constituted of a microcomputer (not shown in the figure) having a central processing unit (CPU) to perform calculation processing, a ROM for storing program data and fixed-value data, a RAM capable of sequentially rewriting data stored therein after updating it, and a backup RAM for holding data stored therein even when an electric power source of the ECU 21 is turned off; drive circuitry (not shown in the figure) for driving actuators; and an input-output (I/O) interface (not shown in the figure) for performing input/output of various kinds of signals.

In addition, voltage output values from the exhaust-gas temperature sensor 20, the water temperature sensor 7 and the boost pressure sensor 19 are analog-to-digit (A/D) converted in the ECU 21 and inputted into it, and each of these A/D-converted output values is used as an exhaust-gas temperature Tex, a cooling water temperature $T_w$ and boost pressure $P_b$, respectively, for calculations by each of the following respective means as will be described below. Moreover, a signal of the crankshaft angle sensor 6 is inputted as an interrupt into the ECU 21, so that the number of revolutions Ne of the engine is calculated by using a timer built in the ECU 21, and the signal of the crankshaft angle sensor 6.

FIG. 2 is a block diagram illustrating the control apparatus of the internal-combustion engine according to Embodiment 1 of the present invention; the control apparatus includes an internal EGR temperature estimation means 22, steady-state exhaust-gas temperature calculation means 23, an internal EGR temperature discrepancy-degree calculation means 24, a transient change-degree calculation means 25, a transient elapse time calculation means 26, a transient strength calculation means 27, a transient-state ignition-timing correction-coefficient calculation means 28, and a transient-state ignition-timing correction means 29. Each of these means is stored as software in a memory of the ECU 21 in FIG. 1 described above.

In the internal EGR temperature estimation means 22, an internal EGR temperature estimation value $T_{egr}$ is estimated based on a cooling water temperature $T_w$ and an exhaust-gas temperature $T_{ex}$. A specific calculation method will be stated referring to FIG. 3 in the explanation for a flow of control described below.

In the steady-state exhaust-gas temperature calculation means 23, a steady-state exhaust-gas temperature $T_{exc}$ is calculated by instantaneous values of the number of revolutions $N_e$ of the engine and boost pressure $P_b$ in calculation timing in a transient operating state, presuming that the steady-state exhaust-gas temperature is obtained if an operating state in these number of revolutions of the engine and boost pressure has been a steady-state operating state. A specific calculation method will be stated referring to FIG. 3 in the explanation for a flow of control described below.

In the internal EGR temperature discrepancy-degree calculation means 24, an internal EGR temperature discrepancy-degree $L_{egr}$ is calculated that indicates a level or degree of discrepancy between the estimated internal EGR temperature $T_{egr}$ and the steady-state exhaust-gas temperature $T_{exc}$ in a steady-state operating state. Here, the larger a value of the internal EGR temperature discrepancy-degree $L_{egr}$ is, the probable a state is in which a misfire and knocking are easy to occur when the ignition timing is changed. A specific calculation method will be stated referring to FIG. 3 in the explanation for a flow of control described below.

In the transient change-degree calculation means 25, a transient change degree $L_{kt}$ is calculated that indicates in what level or degree a transient change demonstrates, based on the deviation in changes between the number of revolutions of the engine and boost pressure immediately before a transient operating state, and the number of revolutions of the engine and boost pressure being currently detected. A specific calculation method will be stated referring to FIG. 3 in the explanation for a flow of control described below.

In the transient elapse time calculation means 26, a transient elapse time $P_{kt}$ is calculated using a timer built in the ECU 21 that counts a duration of time while the transient operating state continues, by setting the timing by one count upstream of the transient operating state being detected as "zero." A specific calculation method will be stated referring to FIG. 3 in the explanation for a flow of control described below.

In the transient strength calculation means 27, transient strength $L_{st}$ that indicates the strength of the transient operating state in current timing is calculated in accordance with the transient change degree $L_{kt}$ and the transient elapse time $P_{kt}$. Here, the larger a value of the transient change degree $L_{kt}$ is, and also the smaller a value of the transient elapse time $P_{kt}$ is, the larger a value of this transient strength $L_{st}$ becomes, indicating a state in which the engine is in a sharply transient operating state, so that a misfire and knocking are easy to occur when the ignition timing is changed. A specific calculation method will be stated referring to FIG. 3 in the explanation for a flow of control described below.

In the transient-state ignition-timing correction-coefficient calculation means 28, a transient-state ignition-timing correction-coefficient $K_{SA}$ is calculated which indicates, as a degree, a duration of ignition timing to be changed from the preceding ignition timing in accordance with the internal EGR temperature discrepancy-degree $L_{egr}$ and the transient strength $L_{st}$. A specific calculation method will be stated referring to FIG. 3 in the explanation for a flow of control described below.

In the transient-state ignition-timing correction means 29, correction is made by the transient-state ignition-timing correction-coefficient $K_{SA}$ with respect to the ignition timing when the engine is in a steady-state operating state, and final ignition timing SA is calculated. A specific calculation method will be stated referring to FIG. 3 in the explanation for a flow of control described below.

Next, in the control apparatus of the internal-combustion engine configured as described above according to Embodiment 1 of the present invention, the explanation will be made for operations in which, when conditions of a transient operating state are satisfied during the spark-discharge ignition control in an HCCI combustion mode, an internal EGR temperature discrepancy-degree is calculated from an estimated internal EGR temperature and steady-state exhaust-gas temperature; transient strength is calculated from a transient change degree and a transient elapse time; a transient-state ignition-timing correction-coefficient is calculated in accordance with the internal EGR temperature discrepancy-degree and the transient strength; and then the ignition timing is corrected.

In the first place, the explanation of each of the operations will be made referring to the flowchart in FIG. Note that, these operations are executed as a subroutine in an interrupt routine that is executed by interrupting at every predetermined crankshaft angle in the ECU 21. In addition, although in Embodiment 1 these operations are executed as the subroutine in an interrupt routine that is executed by interrupting at every predetermined crankshaft angle, it may be adopted that these operations are executed as the subroutine in a main routine executed in a predetermined time period.

Figure 3:
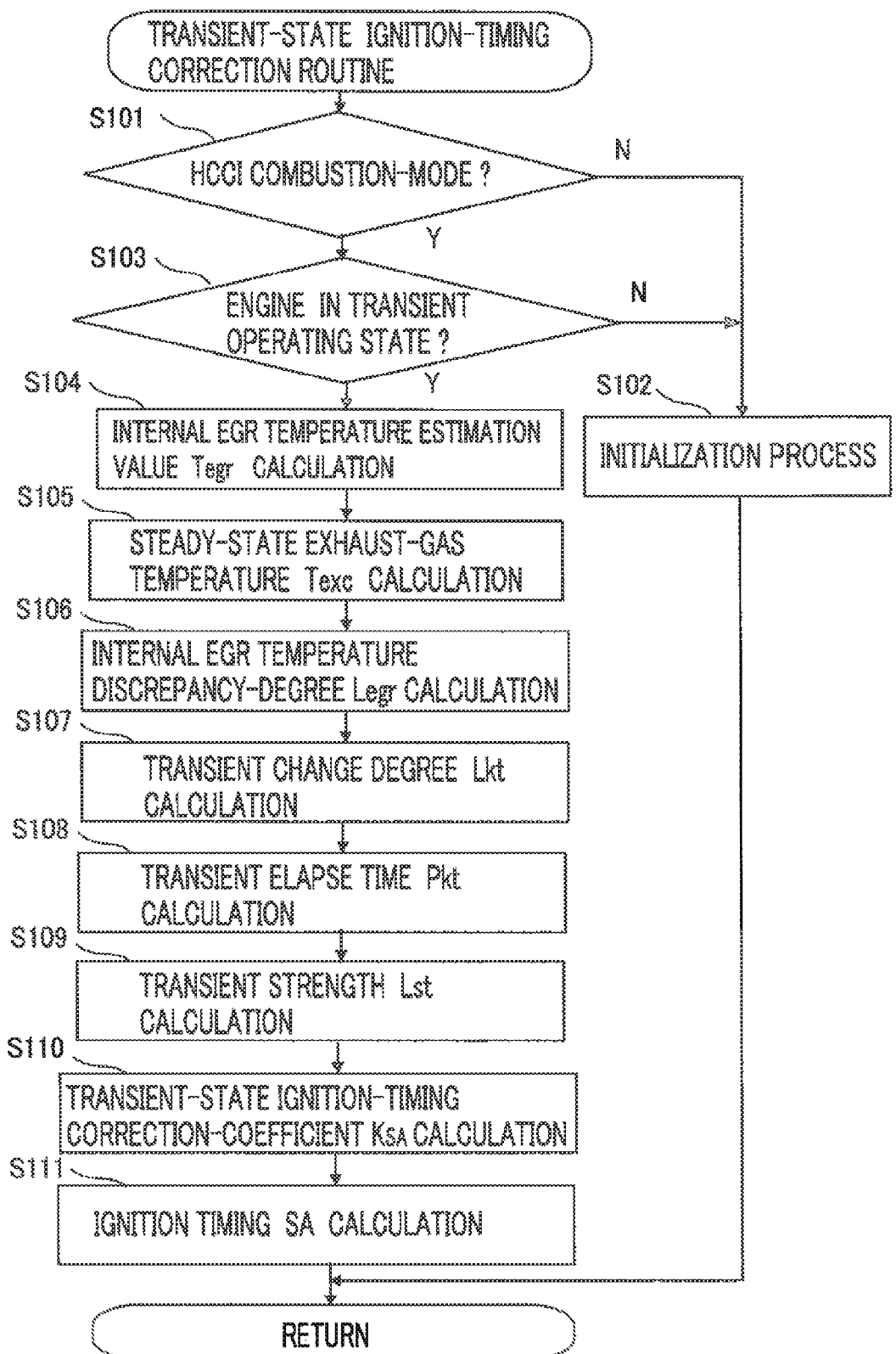
FIG. 3 is a flowchart illustrating operations of the control apparatus of the internal-combustion engine according to Embodiment 1 of the present invention.

In FIG. 3, firstly at Step S101, determination is performed whether or not the engine control is in an HCCI combustion mode. In the HCCI combustion mode, the engine control satisfies conditions when the engine operates in an operating area set in advance in accordance with the number of revolutions of the engine, the load, and the like.

At Step S101, if it is determined that an HCCI combustion mode is not established (N), an initialization process is executed at Step S102. In the initialization process at Step S102, number "0" is inputted for each of the transient elapse time $P_{kt}$, the internal EGR temperature discrepancy-degree $L_{egr}$ and the transient strength $L_{st}$, and ignition timing SA is inputted for the preceding ignition timing $SA_o$; basic ignition timing $SA_b$, for the ignition timing SA; an exhaust-gas temperature $T_{ex}$, for the preceding exhaust-gas temperature $T_{exo}$; the number of revolutions $N_e$ of the engine, for a pre-transient engine revolution-number $N_{eo}$; and boost pressure $P_b$, for pre-transient boost pressure $P_{bo}$. When the initialization process at Step S102 ends, the subroutine is ended without further processing therein.

Meanwhile, at Step S101, if it is determined that the HCCI combustion mode is established (Y), determination is performed at Step S103 whether or not a current engine state is in a transient operating state, or determination is performed whether or not current ignition timing is in progress of change according to Step S104 through Step S111 as described below, and the ignition timing is not converged to ignition timing set in advance in the steady-state operating state of the engine. The determination that is performed whether or not the current ignition timing being in progress of change is made based on whether final ignition timing SA after a transient correction as will be described later does not coincide with basic ignition timing $SA_b$ described later. As a result of the determination at Step S103, if the current engine state is not in a transient operating state, and also the ignition timing is ignition timing in the steady-state operating state of the engine (N), the initialization process is executed at Step S102 because stable combustion can be proceeded, and the subroutine is ended without further processing therein. Note that, the transient operating state is determined that, for example, the preceding values of the number of revolutions Ne of the engine, boost pressure $P_b$ and the like, and the current values of those are compared with each other, and if there exists the difference(s) of predetermined values or more, the current engine state is in a transient operating state.

At Step S103, if it is determined that the current engine state is in a transient operating state, or the current ignition timing is in progress of change (Y), an internal EGR temperature estimation value $T_{egr}$ is estimated at Step S104 using an exhaust-gas temperature $T_{ex}$, the preceding exhaust-gas temperature $T_{exo}$ and a filter coefficient $K_f$ as Equation (1) described below. Note that, the filter coefficient Kf is a ratio of a heat loss due to the heat dissipation caused after an combustion gas inside of the cylinder is discharged into the exhaust manifold 9 until its gas is detected as an exhaust-gas temperature, and is given by Equation (2) described below using a cooling water temperature Tw and a weighting coefficient $K_w$, taking a value from "zero" to "one." The weighting coefficient $K_w$ is defined in a value which uniquely determines the degree of heat loss depending on an engine shape to form a cylinder wall-surface, the area of piston, and the like; if a value of the weighting coefficient $K_w$ is large, it indicates the engine shape having the heat loss large. As for the weighting coefficient $K_w$, its value is set in advance to take a value from "zero" to "one" when it is divided by the cooling water temperature $T_w$. In addition, if the cooling water temperature $T_w$ is high, the heat loss becomes smaller, so that the filter coefficient $K_f$ takes a smaller value. In Equation (3) described below, the preceding exhaust-gas temperature $T_{exo}$ to be used in Equation (1) in next calculation timing is updated immediately after Equation (1) is calculated.

$$T_{egr}=(T_{ex}-K_f\times T_{exo})/(1-K_f) \quad \text{Equation (1)}$$

$$K_f=K_w/T_w \quad \text{Equation (2)}$$

$$T_{ex}\leftarrow T_{ex} \quad \text{Equation (3)}$$

This Step S104 corresponds to the internal EGR temperature estimation means 22.

Next, at Step S105, a steady-state exhaust-gas temperature $T_{exc}$ is calculated which can be obtained if an operating state of the engine with this timing is in a case of a steady-state operating state. The steady-state exhaust-gas temperature $T_{exc}$ is given by instantaneous values of the number of revolutions $N_e$ of the engine and boost pressure $P_b$, using a map in which an exhaust-gas temperature in a steady-state operating state is set in advance in each of the operating states, as Equation (4) described below.

$$T_{exc}=map(N_e, P_b) \quad \text{Equation (4)}$$

Figure 4:
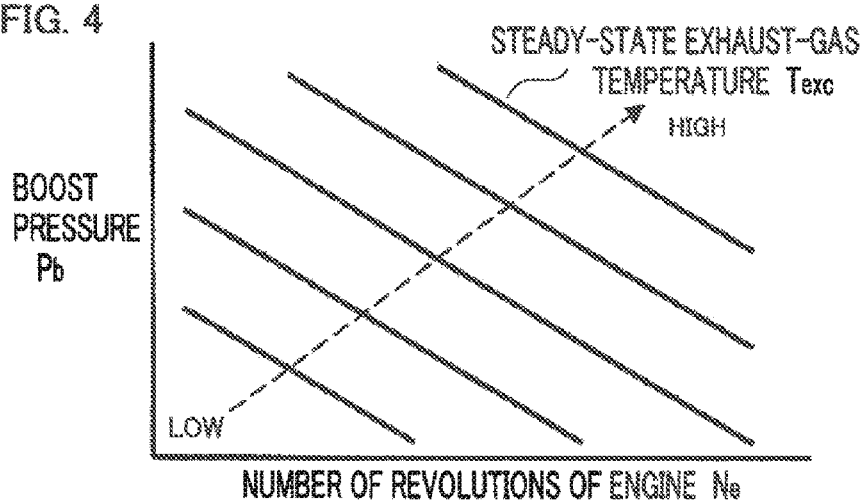
FIG. 4 is a map illustrating characteristics of steady-state exhaust-gas temperatures given by the number of revolutions of an engine and boost pressure in the control apparatus of the internal-combustion engine according to Embodiment 1 of the present invention.

This map is a map in which an exhaust-gas temperature in a steady-state operating state was measured in each of the operating states by an engine characteristic test or the like; for example, as illustrated in FIG. 4, the higher the number of revolutions $N_e$ of the engine is and the higher boost pressure $P_b$ are, the higher a steady-state exhaust-gas temperature $T_{exc}$ is set in advance in the map. Namely, FIG. 4 is a map illustrating the characteristics of steady-state exhaust-gas temperatures given by the number of revolutions of the engine and boost pressure in the control apparatus of the internal-combustion engine according to Embodiment 1 of the present invention; the values are not limited to those set in advance, and thus it may be adopted that the values are also updated further during the operation of the engine in its steady-state operating state.

This Step S105 corresponds to the steady-state exhaust-gas temperature calculation means 23.

At Step S106, as Equation (5) described below, an internal EGR temperature discrepancy-degree $L_{egr}$ is calculated by an internal EGR temperature estimation value $T_{egr}$ and a steady-state exhaust-gas temperature $T_{exc}$. The internal EGR temperature discrepancy-degree $L_{egr}$ indicates the discrepancy between a currently estimated internal EGR temperature and an exhaust-gas temperature in a steady-state operating state by a value from "zero" to "one" as a degree. The larger the internal EGR temperature discrepancy-degree $L_{egr}$ the heavier the engine is in a transient operating state, so to speak.

$$L_{egr}=1-T_{egr}/T_{exc} \quad \text{Equation (5)}$$

This Step S106 corresponds to the internal EGR temperature discrepancy-degree calculation means 24.

Next, at Step S107, a transient change degree $L_{kt}$ is calculated by the number of revolutions Ne of the engine, a pre-transient engine revolution-number Neo, an engine revolution-number weighting coefficient $K_{Ne}$, boost pressure $P_b$, pre-transient boost pressure $P_{bo}$, and a boost-pressure weighting coefficient $K_{Pb}$, as given by Equation (6) described below. Symbol "abs" in Equation (6) gives an absolute value to a calculation result in the parentheses by removing a sign (+ or −).

The engine revolution-number weighting coefficient $K_{Ne}$ and the boost-pressure weighting coefficient $K_{Pb}$ are values set in advance. The transient change degree $L_{kt}$ is indicated from a value "zero" to "one." Note that, the values are inputted for the pre-transient engine revolution-number Neo and the pre-transient boost pressure $P_{bo}$ by the initialization process at Step S102.

$$L_{kt}=abs(N_e-N_{eo})\times K_{Ne}+abs(P_b-P_{bo})\times K_{Pb} \quad \text{Equation (6)}$$

This Step S107 corresponds to the transient change-degree calculation means 25.

At Step S108, the transient elapse time $P_{kt}$ is calculated (updated) by adding a period $T_t$ to a current transient elapse time $P_{kt}$ as Equation (7) described below. The period $T_t$ is calculated as a time from the preceding timing when the subroutine of FIG. 3 has been executed until the current timing using a timer built in the ECU 21. Here, the period $T_t$ is given as a time from the preceding timing when the subroutine has been executed until the current timing; however, the arrangement is not necessarily limited to this; because this subroutine is a subroutine in an interrupt routine executed by interrupting at every predetermined crankshaft angle, it may be adopted that, one is added to update the transient elapse time $P_{kt}$ with respect thereto so as to count combustion cycles.

$$P_{kt}\leftarrow P_{kt}+T_t \quad \text{Equation (7)}$$

This Step S108 corresponds to the transient elapse time calculation means 26.

Figure 5:
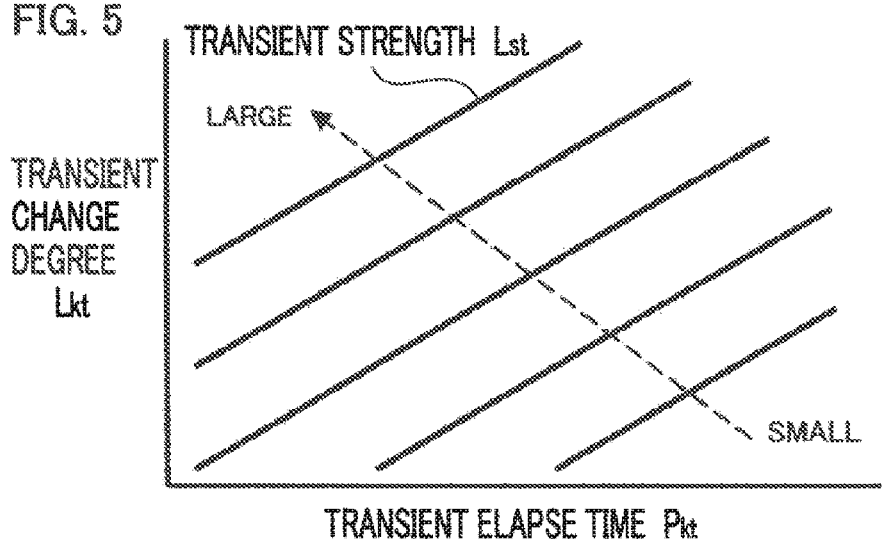
FIG. 5 is a map illustrating characteristics of transient strength given by a transient elapse time and a transient change degree in the control apparatus of the internal-combustion engine according to Embodiment 1 of the present invention.
Figure 6:
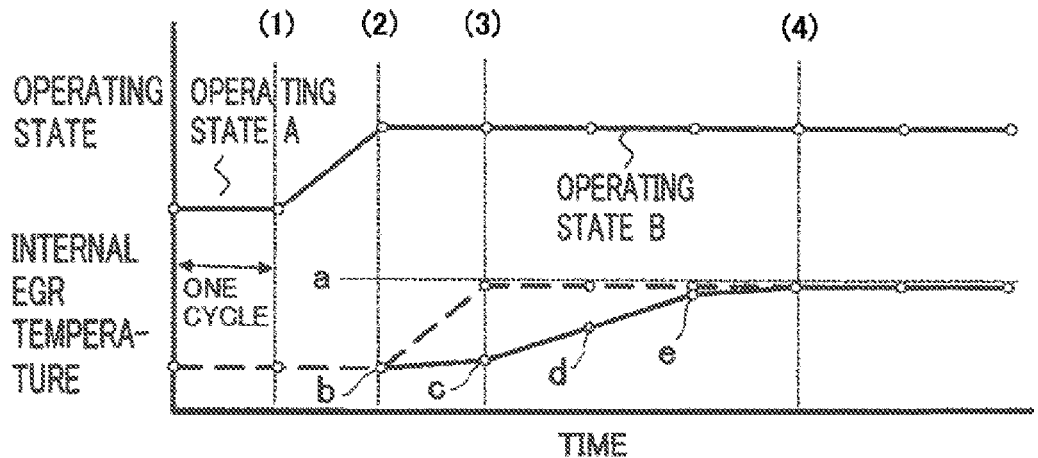
FIG. 6 is an image diagram illustrating behavior of internal EGR temperatures when an engine is in a transient operating state.

At Step S109, the transient strength $L_{st}$ is given using a map in which transient strength is set in advance in response to the transient change degree $L_{kt}$ and the transient elapse time $P_{kt}$, as Equation (8) described below. This map is a map in which, for example as illustrated in FIG. 5, the larger a value of the transient change degree $L_{kt}$ is, and also the smaller a value the transient elapse time $P_{kt}$ is, the larger a value of this transient strength $L_{st}$ becomes, indicating that the engine is in a sharply transient operating state. Namely, FIG. 5 is a map illustrating characteristics of transient strength given by a transient elapse time and a transient change degree in the control apparatus of the internal-combustion engine according to Embodiment 1 of the present invention.

$$L_{st}=map(P_{kt}, L_{kt}) \quad \text{Equation (8)}$$

This Step S109 corresponds to the transient strength calculation means 27.

At Step S110 in accordance with a value in which the internal EGR temperature discrepancy-degree $L_{egr}$ and the transient strength $L_{st}$ are added each other, a transient-state ignition-timing correction-coefficient $K_{SA}$ is given as Equation (9) described below. The transient-state ignition-timing correction-coefficient $K_{SA}$ indicates, as a degree, a duration of ignition timing to be changed from the preceding ignition timing, and takes a value from "zero" to "one".

$$K_{SA}=1-min(L_{egr}+L_{st}, 1) \quad \text{Equation (9)}$$

This Step S110 corresponds to the transient-state ignition-timing correction-coefficient calculation means 28.

Next, at Step S111, final ignition timing SA is given to which the transient correction is made by the transient-state ignition-timing correction-coefficient $K_{SA}$, basic ignition timing $S_{Ab}$ and the preceding ignition timing $SA_o$, as Equation (11) described below. The basic ignition timing $S_{Ab}$ is a value being set when the engine is in a steady-state operating state so as to become a basis of ignition timing, and is calculated by a map being set in advance in accordance with the number of revolutions $N_e$ of the engine and boost pressure, as Equation (12) described below. In Equation (10), the preceding ignition timing SAo used in Equation (11) is updated immediately before Equation (11) is to be calculated.

$$SA_o \leftarrow SA \qquad \text{Equation (10)}$$

$$SA = K_{SA} \times SA_b (1-K_{SA}) \times SA_o \qquad \text{Equation (11)}$$

$$SA_b = \text{map}(N_e, P_b) \qquad \text{Equation (12)}$$

This Step S111 corresponds to the transient-state ignition-timing correction means 29.

When the final ignition timing SA after the transient correction is given according to Step S111, the subroutine ends, and the control is performed so as to ignite with a spark with the timing of ignition timing SA.

Next, in the control apparatus of the internal-combustion engine described above according to Embodiment 1 of the present invention, the explanation will be made referring to a timing diagram illustrated in FIG. 7 for an execution example in which, under an HCCI combustion-mode control and in a transient operating state of the engine, the transient-state ignition-timing correction-coefficient is calculated, by directing at the internal EGR temperature and transient strength, from the internal EGR temperature discrepancy and the transient strength, and, by correcting steady-state ignition timing in accordance with the transient-state ignition-timing correction-coefficient being calculated, transient-state ignition timing is calculated.

Figure 7:
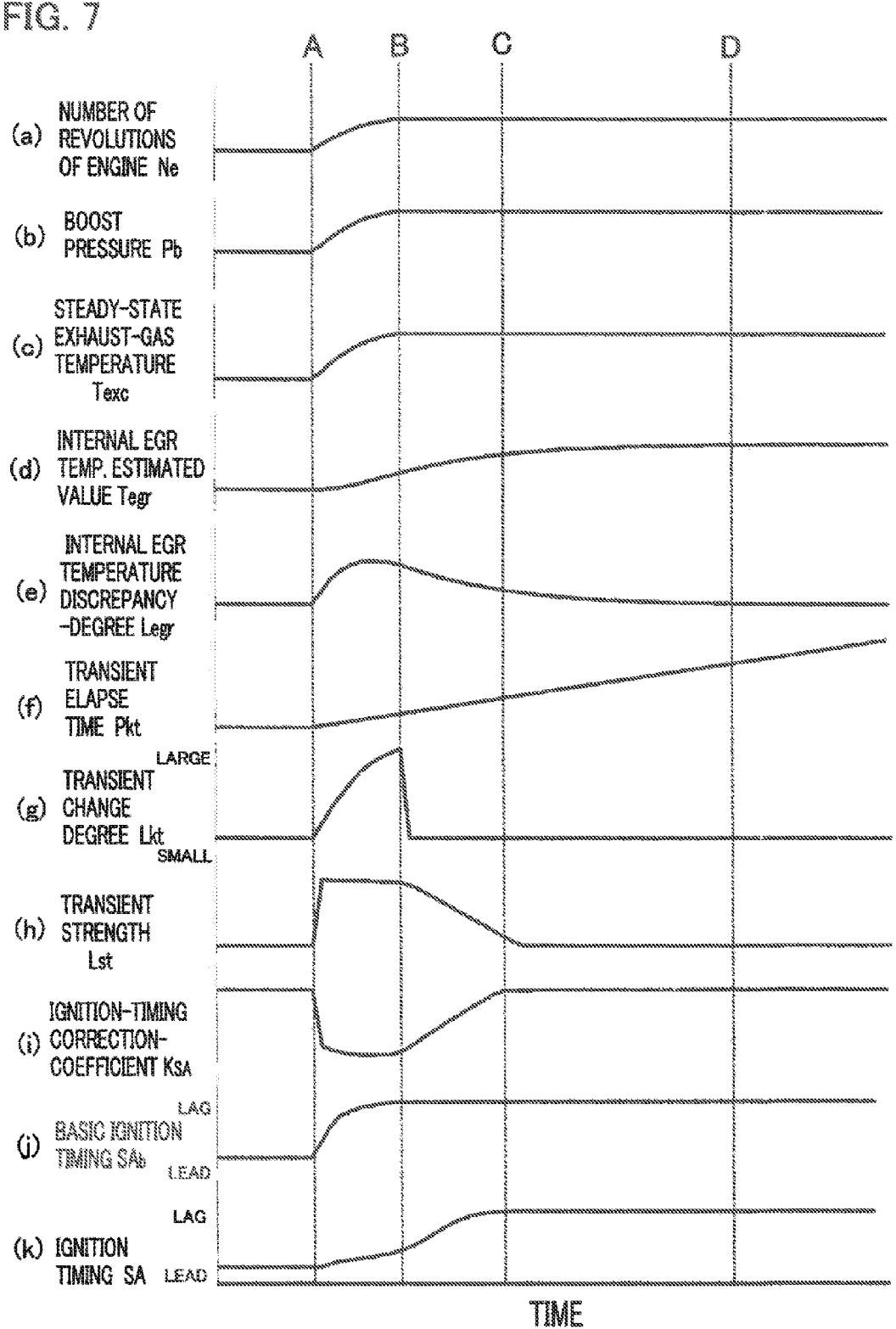
FIG. 7 is a timing diagram illustrating behavior in which an ignition-timing correction is performed when a transient operating state occurs in the control apparatus of the internal-combustion engine according to Embodiment 1 of the present invention.

FIG. 7 is the timing diagram illustrating behavior in which an ignition-timing correction is performed when a transient operating state occurs in the control apparatus of the internal-combustion engine according to Embodiment 1 of the present invention; the diagram is illustrated in FIG. 7 as an example in a case in which an HCCI combustion-mode control is underway, and the number of revolutions of the engine and its load are increasing, so that the engine is in the transient operating state. In FIG. 7, respective time-varying changes are shown by symbol (a) as the number of revolutions $N_e$ of the engine; symbol (b), boost pressure $P_b$; symbol (c), steady-state exhaust-gas temperature $T_{exc}$; symbol (d), internal EGR temperature estimation value $T_{egr}$; symbol (e), internal EGR temperature discrepancy-degree $L_{egr}$; symbol (f), transient elapse time $P_k$; symbol (g), transient change degree $L_{kt}$; symbol (h), transient strength $L_{st}$; symbol (i), transient-state ignition-timing correction-coefficient $K_{SA}$; symbol (j), basic ignition timing $SA_b$; and symbol (k), ignition timing SA.

In FIG. 7, in the first place, the engine is in the steady-state operating state before timing "A" because the number of revolutions $N_e$ of the engine and the boost pressure $P_b$ are constant. For this reason, final ignition timing SA is the same ignition timing as the basic ignition timing $SA_b$ in which the ignition-timing correction according to Embodiment 1 of the present invention is not made, so that the ignition control is performed with this final ignition timing SA.

From the timing "A" to timing "B," the number of revolutions $N_e$ of the engine and the boost pressure $P_b$ are increasing, so that the engine is in the transient operating state. In addition, as for an exhaust-gas temperature obtained when the number of revolutions $N_e$ of the engine and the boost pressure $P_b$ detected in each calculation timing are in constant states (steady-state operating states), a value of the steady-state exhaust-gas temperature $T_{exc}$ becomes larger according to the characteristics in FIG. 4 described above, the number of revolutions $N_e$ of the engine becomes larger, and the boost pressure $P_b$ becomes higher. During the transient operating state, because the internal EGR has a delay of one cycle, and the internal EGR temperature has that in its change as described above, the internal EGR temperature estimation value $T_{egr}$ does not really increase from the timing "A" to the timing "B." Accordingly, the internal EGR temperature discrepancy-degree L that is the discrepancy between a steady-state exhaust-gas temperature $T_{exc}$ and the internal EGR temperature estimation value $T_{egr}$, increases from the timing "A" toward the timing "B."

In addition, a value of the transient elapse time $P_{kt}$ increases from the start of the transient operating state, and a value of the transient change degree $L_{kt}$ becomes larger with time as the transient operating state continues. According to this arrangement, a value of the transient strength $L_{st}$ is very large during the timings from "A" to "B" due to the characteristics in FIG. 5 described above. Although the value of the transient change degree $L_{kt}$ is small immediately after the timing "A," the value of the transient strength $L_{st}$ is large because the value of the transient elapse time $P_{kt}$ is large; in addition, immediately before the timing "B," the transient elapse time $P_{kt}$ is slightly increased, and such tendency can be observed that the transient strength $L_{st}$ decreases; however, a value of the transient strength $L_{st}$ remains large because the transient change degree $L_{kt}$ is increasing.

According to this arrangement, a value of a transient-state ignition-timing correction-coefficient $K_{SA}$ obtained by the internal EGR temperature discrepancy-degree $L_{egr}$ and the transient strength $L_{st}$ becomes small, and the final ignition timing SA in which the transient correction is made changes very little during the timings from "A" to "B." According to this arrangement, the change in ignition timing is made coincident with a change in the internal EGR temperature, so that the combustion during the transient operating state can be made good.

From the timing "B" to timing "C," the number of revolutions $N_e$ of the engine and the boost pressure $P_b$ are constant, and, although the transient operating state is ended, the internal EGR temperature does not reach up to a temperature to become stable. Accordingly, each of the internal EGR temperature discrepancy-degree $L_{egr}$ and the transient strength $L_{st}$ gradually decreases, so that the transient-state ignition-timing correction-coefficient $K_{SA}$ gradually increases, resulting in a large change of the final ignition timing SA. According to this arrangement, the change in ignition timing is made coincident with a change in the internal EGR temperature, so that the combustion after the transient operating state can be made good.

From the timing "C" to timing "D," the internal EGR temperature is going to eventually become stable, and the internal EGR temperature discrepancy-degree $L_{egr}$ becomes eventually "zero" in the timing "D." However, because a value of the transient strength $L_{st}$ is already small, the transient-state ignition-timing correction-coefficient $K_{SA}$ becomes approximately a value of "one," and the change of the final ignition timing SA ends immediately after the timing "C." This is because, if a change in ignition timing is only made coincident with a change in the internal EGR temperature, the change in ignition timing does not end in the timing "C"; however, according to Embodiment 1 of the present invention, because the change in ignition timing is made coincident with the change in the internal EGR temperature, and also the change in ignition timing is made appropriate to an allowable range with respect to the internal EGR temperature responding to the strength of the transient operating state, so that the change in ignition timing can be finished as soon as possible while keeping the combustion good after the transient operating state.

In FIG. 7, the explanation is made for a state as a transient operating state in which the number of revolutions of the engine and the boost pressure $P_b$ are increasing due to acceleration; however, similar effects described above can be obtained even in a transient operating state in which the number of revolutions of the engine and the boost pressure $P_b$ are decreasing due to deceleration.

According to the control apparatus of the internal-combustion engine in Embodiment 1 of the present invention described above, an internal exhaust-gas recirculation (EGR) temperature discrepancy-degree during a transient operating state and after the transient operating state is calculated in accordance with an internal EGR temperature and a steady-state exhaust-gas temperature; the strength of the transient operating state during the transient operating state and after the transient operating state is calculated from a characteristic responding to a transient change degree and a transient elapse time; an ignition-timing correction-coefficient during the transient operating state and after the transient operating state is calculated responding to an internal EGR temperature discrepancy-degree being calculated and transient strength; and the ignition timing is corrected by the calculated transient-state ignition-timing correction-coefficient; and whereby it is possible to control the ignition timing by appropriately defining a delay of change in the internal EGR temperature during the transient operating state of the engine and after its transient operating state thereof, and by appropriately defining an allowable range with respect to the internal EGR temperature responding to the strength of the transient operating state, so that it is not required to mount an expensive sensor(s) or the like, and a change in ignition timing is finished as soon as possible while keeping the HCCI combustion good by an ignition assist when a transient operating state occurs, enabling to enhance exhaust-gas quality, fuel consumption, and drivability.

Embodiment 2

In the control apparatus of the internal-combustion engine according to Embodiment 1 of the present invention described above, the apparatus is configured in such a manner that, when the engine is in a transient operating state, the transient-state ignition-timing correction-coefficient is calculated, by directing at an internal EGR temperature and transient strength, from the internal EGR temperature discrepancy and the transient strength, and transient-state ignition timing is calculated by correcting steady-state ignition timing in accordance with the transient-state ignition-timing correction-coefficient being calculate; meanwhile, an control apparatus of an internal-combustion engine according to Embodiment 2 of the present invention is configured in such a manner that, in addition to the configuration of Embodiment 1, the ignition timing is held in first-time combustion to undergo the transient operating state, and also a correction is made to a characteristic responding to a transient change degree and a transient elapse time by a value responding to a combustion state, when the combustion state is unstable during a transient operating state and after the transient operating state. In addition, in Embodiment 2, it is so arranged in a multi-cylindered engine having four cylinders that ignition timing of each of the cylinders is individually controlled. Note that, as a symbol to designate each of the cylinders, a first cylinder is designated by [1]; a second cylinder, by [2]; a third cylinder, by [3]; and a fourth cylinder, by [4].

Figure 8:
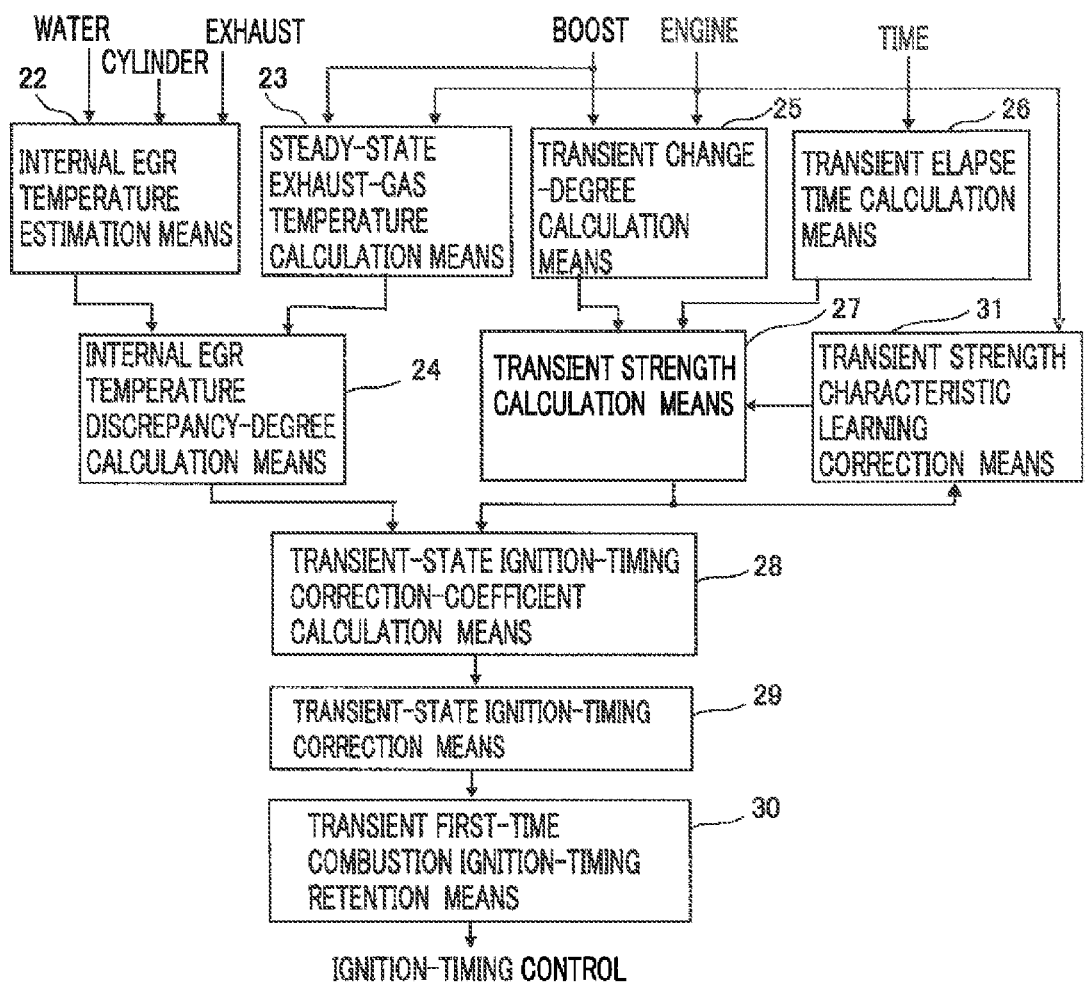
FIG. 8 is a block diagram illustrating a control apparatus of an internal-combustion engine according to Embodiment 2 of the present invention.

FIG. 8 is a block diagram illustrating the control apparatus of the internal-combustion engine according to Embodiment 2 of the present invention. Note that, a configuration diagram illustrating an overall system including the control apparatus of the internal-combustion engine according to Embodiment 2 of the present invention is equivalent or similar to the configuration diagram of FIG. 1 described above. The control apparatus of the internal-combustion engine according to Embodiment 2 of the present invention illustrated in FIG. 8 includes the internal EGR temperature estimation means 22, the steady-state exhaust-gas temperature calculation means 23, the internal EGR temperature discrepancy-degree calculation means 24, the transient change-degree calculation means 25, the transient elapse time calculation means 26, the transient strength calculation means 27, the transient-state ignition-timing correction-coefficient calculation means 28, the transient-state ignition-timing correction means 29, a transient first-time combustion ignition-timing retention means 30, and a transient strength characteristic learning correction means 31 Each of these means is stored as software in a memory of the ECU 21 in FIG. 1.

In addition, into the ECU 21, a signal of a cam angle sensor is inputted as an interrupt, and, according to signal patterns of the crankshaft angle sensor 6 and the cam angle sensor, a cylinder to be next burned thereinside (hereinafter referred to as a "current cylinder") is distinguished in the multi-cylindered engine, so that the cylinder number CN is stored. Note that, other constituent items and things are equivalent or similar to those in Embodiment 1.

In FIG. 8, the transient first-time combustion ignition-timing retention means 30 holds for the ignition timing SA, in first-time combustion since a transient operating state has started in each of the cylinders, ignition timing immediately preceding a transient. A specific calculation method will be stated referring to FIG. 9 in the explanation for a flow of control described below.

The transient strength characteristic learning correction means 31 detects an unstable combustion state from a variation duration of the number of revolutions $N_e$ of the engine or the like, and corrects a value of the transient strength $L_{st}$ by learning it in accordance with the state. A specific calculation method will be stated referring to FIG. 9 in the explanation for a flow of control described below.

Because the internal EGR temperature estimation means 22, the steady-state exhaust-gas temperature calculation means 23, the internal EGR temperature discrepancy-degree calculation means 24, the transient change-degree calculation means 25, the transient elapse time calculation means 26, the transient strength calculation means 27, the transient-state ignition-timing correction-coefficient calculation means 28, and the transient-state ignition-timing correction means 29 illustrated in FIG. 8 are equivalent or similar to those respective means of the same reference numerals in FIG. 2 in Embodiment 1 described above, their detailed explanation is omitted.

Figure 9:
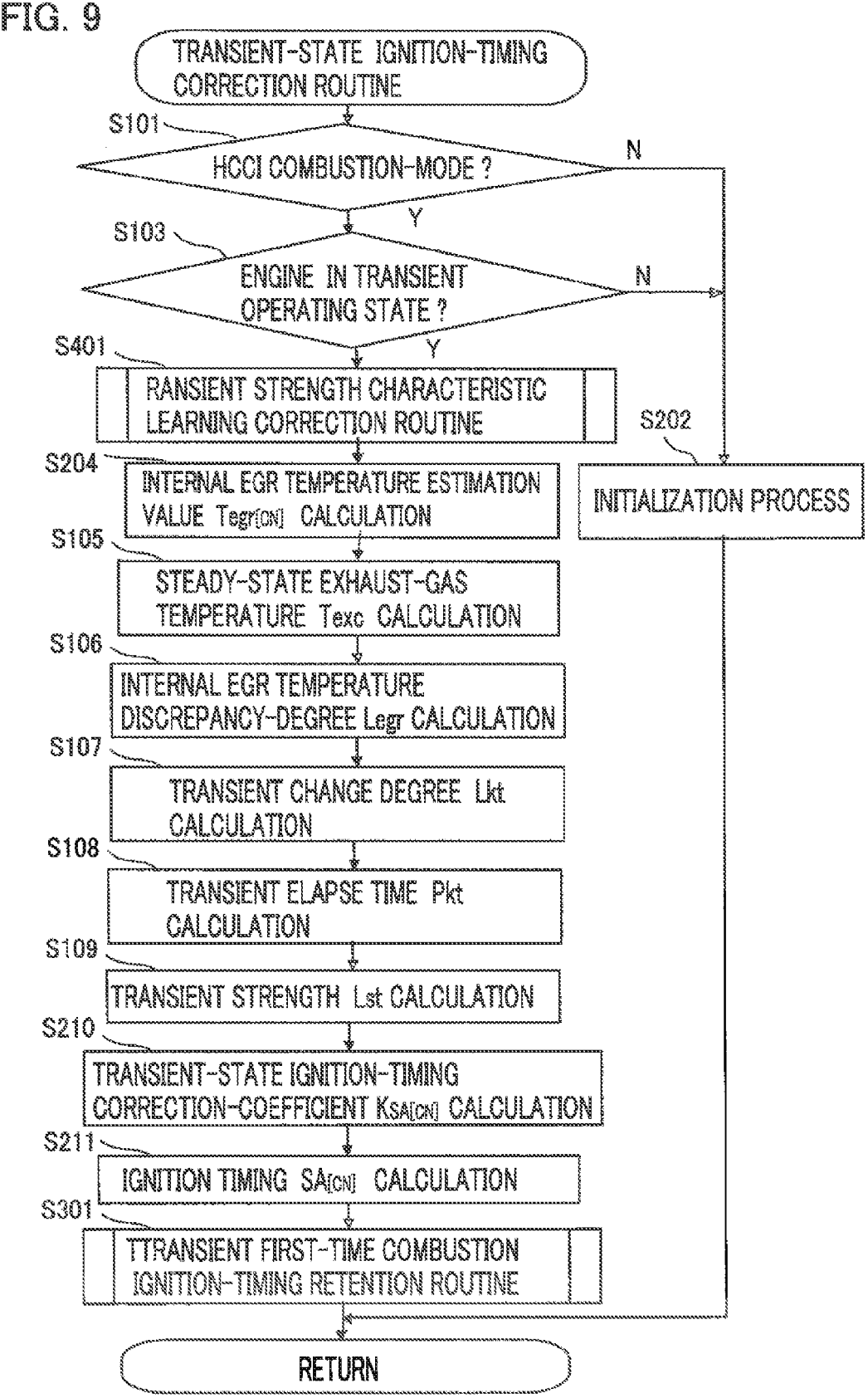
FIG. 9 is a flowchart illustrating operations of the control apparatus of the internal-combustion engine according to Embodiment 2 of the present invention.
Figure 10:
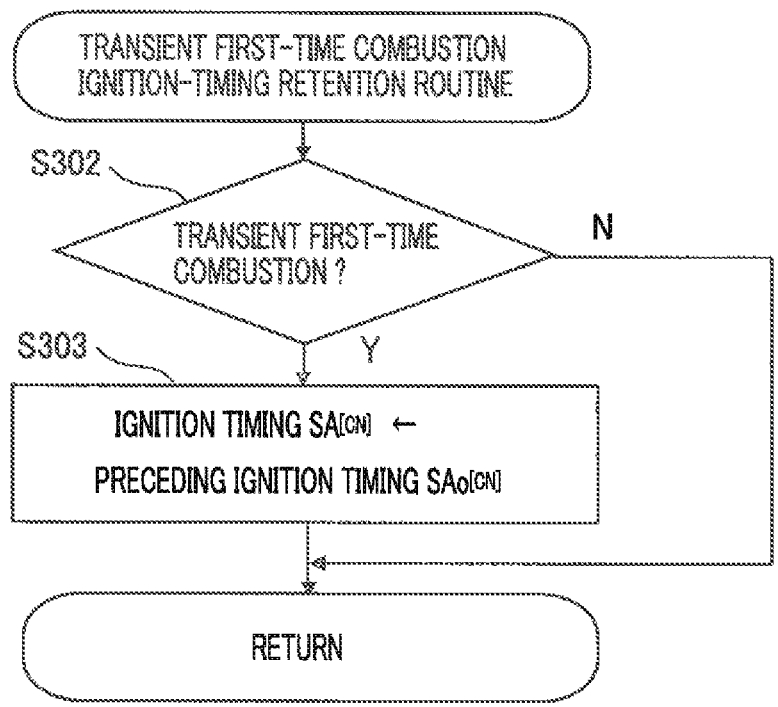
FIG. 10 is a flowchart illustrating operations of a transient first-time combustion ignition-timing retention means of an ECU in the control apparatus of the internal-combustion engine according to Embodiment 2 of the present invention.
Figure 11:
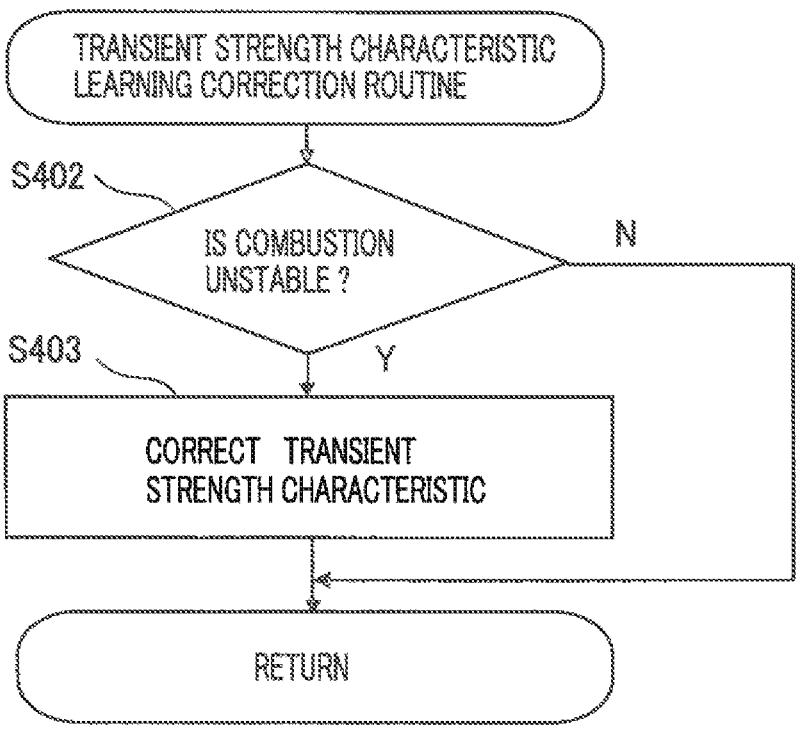
FIG. 11 is a flowchart illustrating operations of a transient strength characteristic learning correction means of the ECU in the control apparatus of the internal-combustion engine according to Embodiment 2 of the present invention.

Next, the explanation will be made in more detail for operations of the control apparatus according to Embodiment 2 of the present invention. Note that, as for the operations equivalent or similar to those in Embodiment 1, their explanation is omitted. FIG. 9 is a flowchart illustrating the operations of the control apparatus of the internal-combustion engine according to Embodiment 2 of the present invention; FIG. 10 is a flowchart illustrating the operations of the transient first-time combustion ignition-timing retention means of the ECU in the control apparatus of the internal-combustion engine according to Embodiment 2 of the present invention; and FIG. 11 is a flowchart illustrating the operations of the transient strength characteristic learning correction means of the ECU in the control apparatus of the internal-combustion engine according to Embodiment 2 of the present invention. Note that, these operations are executed as a subroutine in an interrupt routine that is executed by interrupting at every predetermined crankshaft angle in the ECU 21. In addition, although in Embodiment 2 these operations are executed as the subroutine in an interrupt routine that is executed by interrupting at every predetermined crankshaft angle, it may be adopted that these operations are executed as the subroutine in a main routine executed in a predetermined time period.

In FIG. 9, firstly at Step S101, determination is performed whether or not the engine control is in an HCCI combustion mode. In the HCCI combustion mode, the engine control satisfies conditions when the engine operates in an operating area set in advance in accordance with the number of revolutions of the engine, the load, and the like.

At Step S101, if it is determined that an HCCI combustion mode is not established (N), an initialization process is executed at Step S202. In the initialization process at Step S202, number "0" is inputted for each of the transient elapse time $P_{kt}$, the internal EGR temperature discrepancy-degree $L_{egr}$ and the transient strength $L_{st}$, and ignition timings SA is inputted for the preceding ignition timings $SA_{o[1]}$ through $SA_{o[4]}$; basic ignition timing $SA_b$, for the ignition timings SA; an exhaust-gas temperature Tex, for the preceding exhausting temperatures $T_{exo[1]}$ through $T_{exo[4]}$ immediately after the combustion with respect to each of the cylinders; the number of revolutions $N_e$ of the engine, for a pre-transient engine revolution-number $N_{eo}$; and boost pressure $P_b$, for pre-transient boost pressure $P_{bo}$. When the initialization process at Step S102 ends, the subroutine is ended without further processing therein.

Meanwhile, at Step S101, if it is determined that the HCCI combustion mode is established (Y), determination is performed at Step S103 whether or not a current engine state is in a transient operating state, or determination is performed whether or not current ignition timing is in progress of change according to Step S401 through Step S301 as described below, and the ignition timing is not converged to ignition timing set in advance in the steady-state operating state of the engine. The determination performed whether or not the current ignition timing being in progress of change is made whether final ignition timing SA after a transient correction, as will be described later, does not coincide with basic ignition timing $SA_b$. As a result of the determination at Step S103, if the current engine state is not in a transient operating state, and also the ignition timing is ignition timing in the steady-state operating state of the engine (N), an initialization process is executed at Step S202 because stable combustion can be proceeded, and the subroutine is ended without further processing therein. Note that, the transient operating state is determined that, for example, the preceding values of the number of revolutions Ne of the engine, boost pressure P and the like, and the current values of those are compared with each other, and if there exists the difference(s) of predetermined values or more, the current engine state is in a transient operating state.

At Step S103, if it is determined that the current engine state is in a transient operating state, or the current ignition timing is in progress of change (Y), the processing moves to a transient strength characteristic learning correction routine at Step S401. The explanation for this will be made later.

Next, at Step S204, an internal EGR temperature is estimated with respect to each of the cylinders. An estimation equation for the internal EGR temperature estimation value $T_{egr}$ is the same as that at Step S104 in Embodiment 1; however, the internal EGR temperature estimation value $T_{egr}$ here is calculated as an internal EGR temperature estimation value $T_{egr[CN]}$ corresponding to a current cylinder number, as Equation (13) described below. Symbol [CN] indicated by Equation (13) and the following equations designates a value individually stored as a value corresponding to a cylinder number CN. For example, as for the internal EGR temperature estimation value $T_{egr[CN]}$, the internal EGR temperature estimation value $T_{egr}[1]$ of the first cylinder is given if the current cylinder is the first cylinder, the internal EGR temperature estimation value $T_{egr}[2]$ of the second cylinder, if the current cylinder is the second cylinder, and so forth. Note that, the filter coefficient $K_f$ is similar to that in Equation (2) described above. In Equation (14) described below, the preceding exhaust-gas temperature $T_{exo[CN]}$ to be used in next calculation timing in Equation (13) is updated immediately after Equation (13) is calculated.

$$T_{egr[CN]}=(T_{ex}-K_f \times T_{exo[CN]})/(1-K_f) \qquad \text{Equation (13)}$$

$$T_{exo[CN]} \leftarrow T_{ex} \qquad \text{Equation (14)}$$

At Step S206, similarly to Equation (5) described above, an internal EGR temperature discrepancy-degree $L_{egr[CN]}$ of the current cylinder is calculated by the internal EGR temperature estimation value $T_{egr[CN]}$ of the current cylinder and a steady-state exhaust-gas temperature $T_{exc}$ as Equation (15) described below.

$$L_{egr[CN]}=1-T_{egr[CN]}/T_{exc} \qquad \text{Equation (15)}$$

At Step S210, in accordance with a value in which the internal EGR temperature discrepancy-degree $L_{egr[CN]}$ of the current cylinder and the transient strength $L_{st}$ are added to one another, a transient-state ignition-timing correction-coefficient $K_{SA[CN]}$ of the current cylinder is given as Equation (16) described below that is similar to Equation (9) described above.

$$K_{SA[CN]}=1-\min(L_{egr[CN]}+L_{st}, 1) \qquad \text{Equation (16)}$$

At Step S211, similarly to Equation (11) described above, final ignition timing $SA_{[CN]}$ to which the transient correction is made with respect to the current cylinder is given by the transient-state ignition-timing correction-coefficient $K_{SA[CN]}$ of the current cylinder, basic ignition timing $SA_b$ and the preceding ignition timing $SA_{o[CN]}$ of the current cylinder, as Equation (18) described below. In addition, the basic ignition timing $SA_b$ is similar to that in Equation (12) described above. In Equation (17) described below, the preceding ignition timing $SA_{o[CN]}$ used in the following Equation (18) is updated immediately before Equation (18) is to be calculated.

$$SA_{o[CN]} \leftarrow SA_{[CN]} \qquad \text{Equation (17)}$$

$$SA_{[CN]}=K_{SA[CN]} \times SA_b + (1-K_{SA[CN]}) \times SA_{o[CN]} \qquad \text{Equation (18)}$$

When final ignition timings SA after the transient correction are obtained according to Step S211, the processing moves at Step S301 to a transient first-time combustion ignition-timing retention routine.

In FIG. 10, at Step S302, determination is performed whether the current combustion is first-time combustion since a transient operating state has started in each of the cylinders, namely, the determination is performed whether one upstream combustion is in an steady-state operating state in each of the cylinders. If it is determined that the current combustion is the first-time combustion (Y), the final ignition timing SA[CN] is at Step S303 updated by the preceding ignition timing $SA_{o[CN]}$ as Equation (19) described below, so that the final ignition timing is set as ignition timing of that of the one upstream combustion in the steady-state operating state. According to this arrangement, because there definitely exists a delay of one cycle in the internal EGR in the first-time combustion since the transient operating state has started, it is possible to arrange that ignition timing is achieved according to Step S303 so that it would be less probable that the combustion becomes unstable with respect to the internal EGR temperature of one upstream cycle, even when the change in ignition timing $SA_{[CN]}$ is calculated by Equation (18) described above that may be too large, for example, in the combustion after the first-time, because the internal EGR temperature is changing to a larger or lesser extent, good combustion can be obtained with final ignition timings given by a value(s) calculated by Equation (18).

$$SA_{[CN]} \leftarrow SA_{o[CN]} \qquad \text{Equation (19)}$$

This Step S303 corresponds to the transient first-time combustion ignition-timing retention means 30.

At Step S302, if it is determined that the current combustion is not first-time combustion (N), it is so controlled that the processing returns to a transient-state ignition-timing correction routine without processing further, and the spark-discharge ignition is performed with the timings of ignition timings SA.

Next, the explanation will be made for the operations at Step S401 shown in FIG. 11 as an exemplary case in which the processing at Step S301 shown in FIG. 9 is ended, and the transient-state ignition-timing correction routine is executed with next timing. The transient-state ignition-timing correction routine is executed with the next timing, and, after Step S103 shown in FIG. 9, the processing moves to the transient strength characteristic learning correction routine of Step S401 shown in FIG. 11.

In FIG. 11, determination is performed at Step S402 whether the combustion is unstable. As for the determination method, the determination is made by a determinant indicator value, for example, in a case in which variation of the number of revolutions of the engine is a predetermined value or more, or the like, including the one based on various kinds of well-known technologies and others. If it is determined that the combustion is unstable (Y), namely, when good combustion cannot be obtained by the final ignition timings set in the transient-state ignition-timing correction routine in the preceding timing due to the influence by degradation of each of the sensors, changes in engine characteristics and the likes, a value(s) of transient strength characteristic is corrected at Step S403 by a correction coefficient $K_{ust}$ and updated thereby as Equation (20) described below. According to this arrangement, the combustion is made stabler by correcting the change in ignition timing at Step S211 described above. The correction coefficient $K_{ust}$ is a value correlating to the determinant indicator value used to determine whether the combustion is unstable. In addition, a value of the correction coefficient $K_{ust}$ is given larger than "one" if the unstability of combustion is a misfire sign, when the number of revolutions and/or the load changes from a small value(s) to a large value(s) in a case in which the transient operating state is in acceleration or the like; a value of the correction coefficient $K_{ust}$ is given smaller than "one" if the unstability of combustion is a knocking sign. On the contrary, a value of the correction coefficient $K_{ust}$ is given smaller than "one" if the unstability of combustion is a misfire sign, when the number of revolutions and/or the load changes from a large value(s) to a small value(s) in a case in which the transient operating state is in deceleration or the like; a value of the correction coefficient $K_{ust}$ is given larger than "one" if the unstability of combustion is a knocking sign. Moreover, because this corrected transient strength characteristic is held in a backup RAM that holds the corrected and stored data even when the power source of the ECU 21 is turned off, the corrected transient strength characteristic can be used after the engine is started at a next time even when the engine has once been stopped.

$$\text{map}(P_{kt}, L_{kt}) \leftarrow \text{map}(P_{kt}, L_{kt}) \times K_{ust} \qquad \text{Equation (20)}$$

This Step S403 corresponds to the transient strength characteristic learning correction means 31.

If it is determined at Step S302 in FIG, 10 described above that the current combustion is not first-time combustion (N), it is so controlled that the processing returns to the transient-state ignition-timing correction routine without processing further, and the spark-discharge ignition is performed with the timing of ignition timing $SA_{[CN]}$.

Next, in the control apparatus of the internal-combustion engine described above according to Embodiment 2 of the present invention, the explanation will be made referring to a timing diagram illustrated in FIG. 12 for an execution example in which, under an HCCI combustion-mode control and in a transient operating state of the engine, a transient-state ignition-timing correction-coefficient is calculated, by directing at an internal EGR temperature and transient strength, from the internal EGR temperature discrepancy and the transient strength, and, by correcting steady-state ignition timing in accordance with the transient-state ignition-timing correction-coefficient being calculated, transient-state ignition timing is calculated; and the ignition timing is held in the first-time combustion to undergo a transient operating state, and also a correction is made to a characteristic responding to a transient change degree and a transient elapse time, when the combustion state is unstable during a transient operating state and after the transient operating state.

FIG. 12 is the timing diagram illustrating behavior in which ignition-timing corrections are performed when a transient operating state occurs in the control apparatus of the internal-combustion engine according to Embodiment 2 of the present invention; the diagram is illustrated in FIG. 12 similarly to FIG. 7 as an example in a case in which an HCCI combustion-mode control is underway, and the number of revolutions of the engine and its load are increasing, so that the engine is in the transient operating state.

In a value in each of the cylinders ([1] through [4]), a value of the current cylinder is only calculated and updated in each timing; however, it should be noted that, in order to make the explanation for ease of understanding in FIG. 12, the behavior is illustrated in that the values of all of the cylinders are to be calculated and updated with each timing. In addition, in order to make the figure for ease of viewing, explanatory legends are shown only for the first cylinder ([1]) that firstly starts a transient operating state, and the second cylinder ([2]) that lastly starts a transient operating state. The sequence of combustion is [1], [3], [4], [2], [1], and so forth. In FIG. 12, respective time-varying changes are shown by symbol (a) as the number of revolutions Ne of the engine; symbol (b), boost pressure $P_b$; symbol (c), steady-state exhaust-gas temperature $T_{exc}$; symbol (d), internal EGR temperature estimation value $T_{egr[CN]}$; symbol (e), internal EGR temperature discrepancy-degree $L_{egr}$; symbol (f), transient elapse time $P_k$; symbol (g), transient change degree $L_{kt}$; symbol (h), transient strength $L_{st}$; symbol (i), transient-state ignition-timing correction-coefficients $K_{SA[CN]}$; symbol (j), basic ignition timing $SA_b$; and symbol (k), ignition timing $SA_{[CN]}$.

In FIG. 12, from timing "A" to timing "B," the number of revolutions Ne of the engine and the boost pressure $P_b$ are increasing, so that the engine is in the transient operating state. Here, for example, the internal EGR temperature estimation values $T_{egr}$ and the internal EGR temperature discrepancy-degrees $L_{egr}$ in the timing "B" are different in their values between the cylinders with one another. This is because, the later the transient operating state starts, the faster the internal EGR temperature changes. Namely, when a transient operating state starts at the first cylinder, differences of the number of revolutions of the engine and boost pressure at the first cylinder are small before the transient operating state and at its start-up time; however, because at the second cylinder in which a transient operating state starts in the latest, differences of the number of revolutions of the engine and boost pressure are larger in comparison with other cylinders before the transient operating state and at its start-up, and also because a combustion temperature also changes largely before the start of transient operating state and at its start-up, it is conceivable that the change in the internal EGR temperature is also fast. Accordingly, following the sequence in which the transient operating states start later, in the order of [2], [4], [3] and [1], the internal EGR temperature estimation values $T_{egr}$ and the internal EGR temperature discrepancy-degrees $L_{egr}$ demonstrate small changes, and the transient-state ignition-timing correction-coefficients $K_{SA}$ and the final ignition timings SA in which transient correction is made demonstrate large changes. According to these arrangements change in ignition timing is made coincident with a change in the internal EGR temperature responding to each of the cylinders, so that the combustion during the transient operating states can be made better.

However, immediately after the timing "A" that is the start-up timing of the transient operating states, the ignition timings being those before the start-up of the transient operating states are held for all of the cylinders as indicated in timing (1). According to these arrangements, the combustion during the transient operating states can be reliably made better.

Also from the timing "B" to timing "C," because the changes in the internal EGR temperature estimation values $T_{egr}$ and the internal EGR temperature discrepancy-degrees $L_{egr}$ are large in the order of [2], [4], [3] and [1], the transient-state ignition-timing correction-coefficients $K_{SA}$ and the final ignition timings SA finish their changes faster in the order of [2], [4], [3] and [1]. According to these arrangements, the change in ignition timing is made coincident with a change in the internal EGR temperature responding to each of the cylinders, so that the combustion after the transient operating states can be made better.

In addition, in the timing (2) between the timing "B" and the timing "C," variations occur in the number of revolutions the engine, so that the combustion becomes unstable (misfire sign) Under this situation, a value of the correction coefficient $K_{ust}$ takes a larger value than "one" though this is not shown by the timing diagram in FIG. 12, a value of transient strength characteristic is corrected so that a value of transient strength becomes larger. According to these arrangements, when the transient operating states occur, the combustion can be more reliably made better.

From the timing "C" to timing "D," the changes in the final ignition timings SA have already ended in the timing "C" for all of the cylinders, so that there is no change. According to these arrangements, while making the combustion better after the transient operating states, it is possible to finish the changes in ignition timings as soon as possible.

According to the control apparatus of the internal-combustion engine in Embodiment 2 of the present invention described above, an internal exhaust-gas recirculation (EGR) temperature discrepancy-degree during a transient operating state and after the transient operating state is calculated in accordance with an internal EGR temperature and a steady-state exhaust-gas temperature; the strength of the transient operating state during the transient operating state and after the transient operating state is calculated from a characteristic responding to a transient change degree and a transient elapse time; an ignition-timing correction-coefficient during the transient operating state and after the transient operating state is calculated responding to an internal EGR temperature discrepancy-degree being calculated and transient strength; and the ignition timing is corrected by the calculated transient-state ignition-timing correction-coefficient; and whereby it is possible to control the ignition timing by appropriately defining a delay of change in the internal EGR temperature during the transient operating state of the engine and after its transient operating state thereof, and by appropriately defining an allowable range with respect to the internal EGR temperature responding to the strength of the transient operating state, so that it is not required to mount an expensive sensor(s) or the like, and a change in ignition timing is finished as soon as possible while keeping the HCCI combustion good by an ignition assist when a transient operating state occurs, enabling to enhance exhaust-gas quality, fuel consumption, and drivability.

In addition, by holding the ignition timing without changing it in the first-time combustion since the transient operating state has started, it is possible to arrange that a delay of one cycle in the internal EGR is reliably implemented in timing when the change in the operating state is presumed to be relatively large, and the control is achieved with ignition timing when it would be less probable that the combustion becomes unstable, so that the HCCI combustion can be reliably made better.

Moreover, because the accuracy of transient strength characteristic can be enhanced by making a correction to the transient strength characteristic by a value responding to a combustion state when the combustion state is unstable, the transient strength, the transient-state ignition-timing correction-coefficient and the ignition timing can be calculated more accurately, and thus it is possible to enhance the HCCI combustion by the ignition assist more reliably when the transient operating states occur.

The control apparatus of the internal-combustion engine in each of the embodiments of the present invention described above gives a concrete form to the invention(s) described below.

(1) A control apparatus of an internal-combustion engine according to the present invention, including:
a fuel injection valve for directly injecting a fuel inside of a cylinder of the internal-combustion engine;
an intake valve for introducing air inside of the cylinder;
an exhaust valve for discharging a combustion gas inside of the cylinder;
a variable valve mechanism for variably adjusting open/close timing and amounts of lift of the intake valve and the exhaust valve;
a spark plug for igniting, with a spark, a mixture of air and the fuel inside of the cylinder; and
a homogeneous-charge compression-ignition combustion control mechanism for performing internal exhaust-gas recirculation inside of the cylinder by controlling open/close timing and amounts of lift of the intake valve and the exhaust valve using the variable valve mechanism, and for performing, with respect to a mixture of air being introduced and a fuel being injected which are heated by the internal exhaust-gas recirculation at a latter part of a compression stroke of the internal-combustion engine before homogeneous-charge compression-ignition combustion, an ignition assist control by spark ignition so as to enhance the homogeneous-charge compression-ignition combustion, the control apparatus of an internal-combustion engine comprises:
an internal exhaust-gas recirculation temperature estimation means for estimating a temperature of the internal exhaust-gas recirculation in the internal-combustion engine;
a steady-state exhaust-gas temperature calculation means for calculating an exhaust-gas temperature of the combustion gas when a state of the internal-combustion engine has been in a steady-state operating state;
an internal exhaust-gas recirculation temperature discrepancy-degree estimation means for calculating, in accordance with a temperature of the internal exhaust-gas recirculation being estimated and an exhaust-gas temperature being calculated in the steady-state operating state, an internal exhaust-gas recirculation temperature discrepancy-degree as a delay of change in a temperature of the internal exhaust-gas recirculation, when a state of the internal-combustion engine is in progress in a transient operating state, and after the transient operating state;
a transient change-degree calculation means for calculating a transient change degree indicating a magnitude of change in an operating state of the internal-combustion engine;
a transient elapse time calculation means for calculating a transient elapse time since the transient operating state of the internal-combustion engine has started;
a transient strength calculation means for calculating, from a characteristic responding to a transient change degree being calculated and a transient elapse time being calculated, transient strength as strength of a transient operating state, when a state of the internal-combustion engine is in progress in the transient operating state and after the transient operating state;
a transient-state ignition-timing correction-coefficient calculation means for calculating a transient-state ignition-timing correction-coefficient responding to an internal exhaust-gas recirculation temperature discrepancy-degree being calculated and transient strength being calculated during the transient operating state and after the transient operating state so as to set a change in ignition timing made coincident with a change in a temperature of the internal exhaust-gas recirculation, and also made coincident with the transient strength of transient operating state being calculated; and a transient-state ignition-timing correction means for correcting the ignition timing on a basis of the transient-state ignition-timing correction-coefficient being calculated.

According to the control apparatus of the internal-combustion engine of the present invention configured as described above, an internal exhaust-gas recirculation (EGR) temperature discrepancy-degree during a transient operating state and after the transient operating state is calculated in accordance with an internal EGR temperature and a steady-state exhaust-gas temperature; the strength of the transient operating state during the transient operating state and after the transient operating state is calculated from a characteristic responding to a transient change degree and a transient lapse time; an ignition-timing correction-coefficient during the transient operating state and after the transient operating state is calculated responding to an internal EGR temperature discrepancy-degree being calculated and transient strength; and the ignition timing is corrected by the calculated transient-state ignition-timing correction-coefficient; and whereby it is possible to control the ignition timing by appropriately defining a delay of change in the internal EGR temperature during the transient operating state of the engine and after its transient operating state thereof, and by appropriately defining an allowable range with respect to the internal EGR temperature responding to the strength of the transient operating state, so that it is not required to mount an expensive sensor(s) or the like, and a change in ignition timing is finished as soon as possible while keeping the HCCI combustion good by an ignition assist when a transient operating state occurs, enabling to enhance exhaust-gas quality, fuel consumption, and drivability.

(2) The control apparatus of the internal-combustion engine as set forth in (1) described above is characterized in that the control apparatus further comprises a transient first-time combustion ignition-timing retention means for holding, without performing correction of the ignition timing by the transient-state ignition-timing correction means in first-time combustion since the transient operating state has started, the ignition timing without changing it.

According to the control apparatus of the internal-combustion engine of the present invention configured as described above, by holding the ignition timing without changing it in the first-time combustion since the transient operating state has started, it is possible to arrange that a delay of one cycle in the internal EGR is reliably implemented in timing when the change in the operating state is presumed to be relatively large, and the control is achieved with ignition timing when it would be less probable that the combustion becomes unstable, so that the HCCI combustion can be reliably made better.

(3) The control apparatus of the internal-combustion engine as set forth in (1) or (2) described above is characterized in that the control apparatus further comprises
a combustion-state detection means for detecting a combustion state of the internal-combustion engine; and
a transient strength characteristic learning correction means for making a correction to a characteristic responding to a transient change degree being calculated and a transient elapse time being calculated by a value responding to a combustion state being detected, when the combustion state is unstable, wherein
a characteristic being corrected is also held after an electric power source of the internal-combustion engine is turned off.

According to the control apparatus of the internal-combustion engine of the present invention configured as described above, the accuracy of transient strength characteristic can be enhanced by making a correction to the transient strength characteristic by a value responding to a combustion state when the combustion state is unstable, so that the transient strength, the transient-state ignition-timing correction-coefficient and the ignition timing can be calculated more accurately, and thus it is possible to enhance the HCCI combustion by the ignition assist more reliably when the transient operating state occurs.

Note that, while the present invention has been shown and described in detail, the foregoing description is in all aspects illustrative and not restrictive. It is therefore understood that, in the present invention, each of the embodiments can be freely combined, appropriately modified and/or eliminated without departing from the scope of the invention.

What is claimed is:

1. A control apparatus of an internal-combustion engine, including:
    a fuel injection valve for directly injecting a fuel inside of a cylinder of the internal-combustion engine;
    an intake valve for introducing air inside of the cylinder;
    an exhaust valve for discharging a combustion gas inside of the cylinder;
    a variable valve mechanism for variably adjusting open/close timing and amounts of lift of the intake valve and the exhaust valve;
    a spark plug for igniting, with a spark, a mixture of air and the fuel inside of the cylinder; and
    a homogeneous-charge compression-ignition combustion control mechanism for performing internal exhaust-gas recirculation inside of the cylinder by controlling open/close timing and amounts of lift of the intake valve and the exhaust valve using the variable valve mechanism, and for performing, with respect to a mixture of air being introduced and a fuel being injected which are heated by the internal exhaust-gas recirculation at a latter part of a compression stroke of the internal-combustion engine before homogeneous-charge compression-ignition combustion, an ignition assist control by spark ignition so as to enhance the homogeneous-charge compression-ignition combustion, the control apparatus of an internal-combustion engine, comprising:
    an internal exhaust-gas recirculation temperature estimation means for estimating a temperature of the internal exhaust-gas recirculation in the internal-combustion engine;
    a steady-state exhaust-gas temperature calculation means for calculating an exhaust-gas temperature of the combustion gas when a state of the internal-combustion engine has been in a steady-state operating state;
    an internal exhaust-gas recirculation temperature discrepancy-degree estimation means for calculating, in accordance with a temperature of the internal exhaust-gas recirculation being estimated and an exhaust-gas temperature being calculated in the steady-state operating state, an internal exhaust-gas recirculation temperature discrepancy-degree as a delay of change in a temperature of the internal exhaust-gas recirculation, when a state of the internal-combustion engine is in progress in a transient operating state, and after the transient operating state;
    a transient change-degree calculation means for calculating a transient change degree indicating a magnitude of change in an operating state of the internal-combustion engine;
    a transient elapse time calculation means for calculating a transient elapse time since the transient operating state of the internal-combustion engine has started;
    a transient strength calculation means for calculating, from a characteristic responding to a transient change degree being calculated and a transient elapse time being calculated, transient strength as strength of a transient operating state, when a state of the internal-combustion engine is in progress in the transient operating state and after the transient operating state;
    a transient-state ignition-timing correction-coefficient calculation means for calculating a transient-state ignition-timing correction-coefficient responding to an internal exhaust-gas recirculation temperature discrepancy-degree being calculated and transient strength being calculated during the transient operating state and after the transient operating state so as to set a change in ignition timing made coincident with a change in a temperature of the internal exhaust-gas recirculation, and also made coincident with the transient strength of transient operating state being calculated; and
    a transient-state ignition-timing correction means for correcting the ignition timing on a basis of the transient-state ignition-timing correction-coefficient being calculated.

2. The control apparatus of the internal-combustion engine as set forth in claim 1, further comprising a transient first-time combustion ignition-timing retention means for holding, without performing correction of the ignition timing by the transient-state ignition-timing correction means in first-time combustion since the transient operating state has started, the ignition timing without changing it.

3. The control apparatus of the internal-combustion engine as set forth in claim 1, further comprising:
    a combustion-state detection means for detecting a combustion state of the internal-combustion engine; and
    a transient strength characteristic learning correction means for making a correction to a characteristic responding to a transient change degree being calculated and a transient elapse time being calculated by a value responding to a combustion state being detected, when the combustion state is unstable, wherein
    a characteristic being corrected is also held after an electric power source of the internal-combustion engine is turned off.

4. The control apparatus of the internal-combustion engine as set forth in claim 2, further comprising:
    a combustion-state detection means for detecting a combustion state of the internal-combustion engine; and
    a transient strength characteristic learning correction means for making a correction to a characteristic responding to a transient change degree being calculated and a transient elapse time being calculated by a value responding to a combustion state being detected, when the combustion state is unstable, wherein
    a characteristic being corrected is also held after an electric power source of the internal-combustion engine is turned off.

* * * * *